United States Patent
Kim et al.

[11] Patent Number: 5,876,299
[45] Date of Patent: Mar. 2, 1999

[54] INFINITELY VARIABLE SPEED TRANSMISSION

[75] Inventors: Man Shik Kim, Seoul; Jeong Cheol Kim; Tae Kwan Eum, both of Incheon; Young Deok Choi, Seoul; Kyeong Hwan Kim, Incheon; In Wook Yeo; Jeong Yoon Kim, both of Seoul, all of Rep. of Korea

[73] Assignee: Daewoo Motor Co., Ltd., Incheon, Rep. of Korea

[21] Appl. No.: 737,744

[22] PCT Filed: Mar. 22, 1996

[86] PCT No.: PCT/KR96/00038

§ 371 Date: Nov. 21, 1996

§ 102(e) Date: Nov. 21, 1996

[87] PCT Pub. No.: WO96/30672

PCT Pub. Date: Oct. 3, 1996

[30] Foreign Application Priority Data

| Mar. 24, 1995 | [KR] | Rep. of Korea | 1995-6282 |
| Mar. 27, 1995 | [KR] | Rep. of Korea | 1995-6571 |
| Jul. 28, 1995 | [KR] | Rep. of Korea | 1995-22631 |
| Jul. 28, 1995 | [KR] | Rep. of Korea | 1995-22632 |
| Nov. 29, 1995 | [KR] | Rep. of Korea | 1995-44747 |
| Nov. 29, 1995 | [KR] | Rep. of Korea | 1995-44748 |
| Nov. 29, 1995 | [KR] | Rep. of Korea | 1995-44749 |

[51] Int. Cl.⁶ ............................. F16H 15/16; F16H 37/02
[52] U.S. Cl. ........................... 475/215; 475/193; 475/218
[58] Field of Search .................................. 475/190, 193, 475/194, 197, 185, 214, 215, 218, 219, 300, 330

[56] References Cited

U.S. PATENT DOCUMENTS

| 2,062,901 | 12/1936 | Graham | 475/193 |
| 3,108,496 | 10/1963 | Kashihara | 475/194 |
| 3,406,597 | 10/1968 | Perry et al. | 475/216 X |
| 3,677,109 | 7/1972 | Stuemky | 475/194 X |
| 4,152,946 | 5/1979 | Kemper | 475/166 |
| 4,233,859 | 11/1980 | Kemper | 475/184 |
| 4,641,548 | 2/1987 | Greenwood | 475/217 X |
| 4,662,240 | 5/1987 | Greenwood | 475/216 |
| 4,682,511 | 7/1987 | Wittke | 475/218 |
| 4,768,398 | 9/1988 | Greenwood | 475/216 |
| 4,892,012 | 1/1990 | Kashihara | 475/186 |
| 5,074,830 | 12/1991 | Perry | 475/216 |
| 5,545,100 | 8/1996 | Roovers et al. | 475/193 |

*Primary Examiner*—Rodney H. Bonck
*Assistant Examiner*—Scott Lund
*Attorney, Agent, or Firm*—Roylance, Abrams, Berdo & Goodman, L.L.P.

[57] ABSTRACT

Disclosed is an infinitely variable speed transmission, including: a speed changing mechanism for primarily changing power from an engine into a necessary speed ratio, including: a sun gear disposed on an input shaft for transmitting power generated from the engine; a plurality of planet rollers which are disposed around the sun gear at a predetermined distance from each other, each planet roller having a truncated cone-shape and being revolvable around the sun gear and rotatable about its axis; a carrier for connecting the planet rollers with each other; a movable ring disposed to be circumscribed on outer tangential line of the planet rollers and movable by moving member along a longitudinal direction of the planet rollers to change a rotational speed of the planet rollers by varying an operating diameter so that an output speed outputted through the carriers connecting the planet roller with each other can be varied; and a second speed changing mechanism for changing the output speed from the speed changing mechanism as a necessary final output speed, including: low and high speed control members which are selectively connected with the first speed changing mechanism.

17 Claims, 14 Drawing Sheets

(A)

Fig. 5
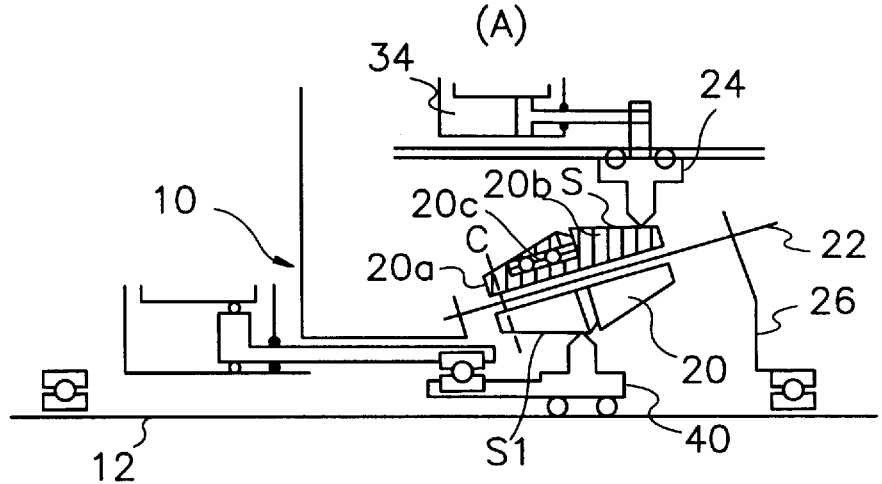
(A)
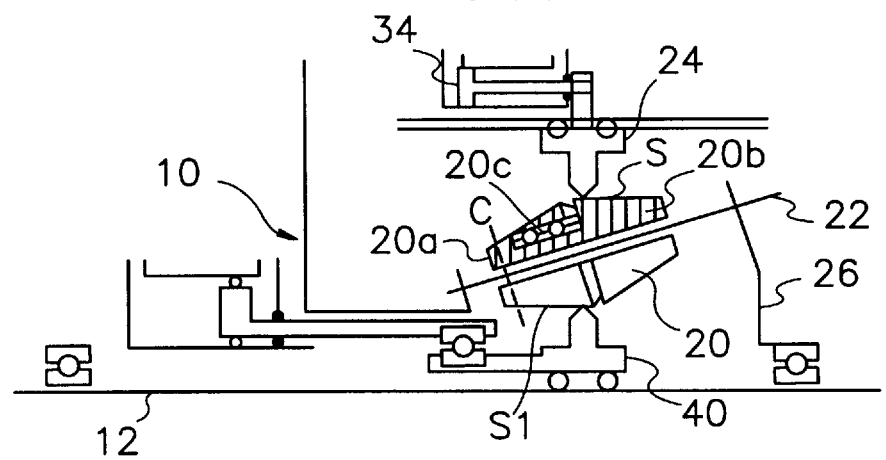
FIG 5 (B)
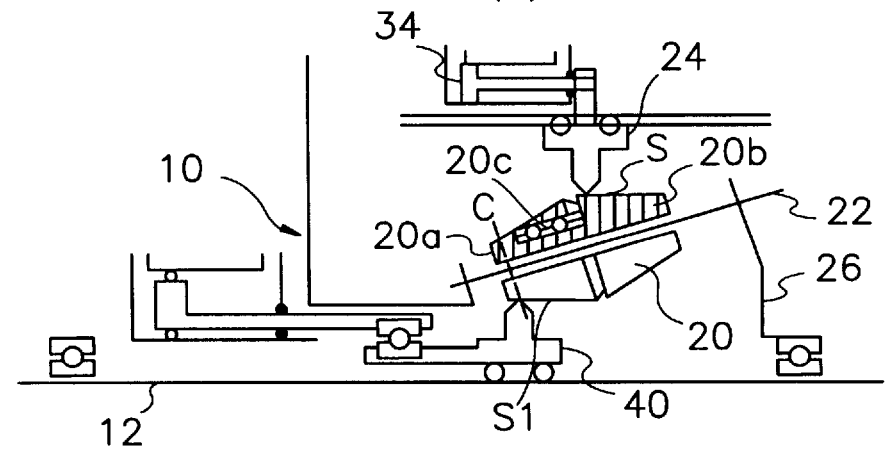
FIG 5 (C)

| Speed changing stage | Operating elements | |
|---|---|---|
| | C1 | C2 |
| neutral | O | X |
| low speed–medium speed | X | X |
| medium speed–high speed | O | X |
| reverse | X | O |

Fig. 14

| Speed changing stage | Operating elements | | |
|---|---|---|---|
| | C1 | C2 | O/C (70) |
| neutral | X | X | X |
| low speed— medium speed | X | O | |
| medium speed— high speed | O | X | (O) |
| reverse | X | O | |

| Speed changing stage | Operating elements | | |
|---|---|---|---|
| | C1 | C2 | O/C |
| neutral | X | X | X |
| low speed– medium speed | O | X | |
| medium speed– high speed | X | O | (O) |
| reverse | O | X | |

INFINITELY VARIABLE SPEED TRANSMISSION

FIELD OF THE INVENTION

The present invention relates to a transmission for infinitely variable power transmitted from a power generating system to a driving means into a necessary speed ratio, and particularly to a friction wheel-type of an infinitely variable speed transmission which is compact in size, has improved power transmission efficiency, and can widen the speed changing range.

BACKGROUND OF THE INVENTION

Generally, automotive vehicles use a transmission controlling output of a power generating means so that rotational speed of the power generating means can be controlled to be appropriate for the load applied to the driving means and operating state thereof.

Transmissions used for this purpose can be classified into two types. One is a manual transmission which is manually shifted to each speed changing stage, and the other is an automatic transmission which can be automatically shifted to each speed changing stage. In recent years, the automatic transmission has been popular because of the convenience in its manipulation.

Furthermore, in the automatic transmission, various speed ratios are predetermined and the automatic shift is accomplished while various operating elements are selectively operated in accordance with the vehicle's driving conditions.

Accordingly, the conventional automatic transmission generally comprises a plurality of planetary gear units, a plurality of operating elements for controlling each elements of the planetary gear unit, and a complex control system for controlling the operating elements. This results in complicating and enlarging the structure thereof Therefore, it is impossible to commonly apply the automatic transmission specified as an fixed model to various driving means. In addition, when applying the automatic transmission to the driving means such as automotive vehicles, the big size of the automatic transmission requires a big mounting space, resulting in making it difficult to mount the specified automatic transmission into the various type of vehicle.

Furthermore, in the conventional automatic transmissions, the speed changing operation is not accomplished linearly. That is, a speed change from one stage to another stage is not continuously realized such that the engine which is the power generating device is overloaded, thereby deteriorating ride comfort by shift shock.

To solve the above described problems of the conventional automatic transmission, there has been developed infinitely variable speed transmission which can continuously accomplish the speed changing operation in accordance with the vehicle's driving condition, thereby preventing the speed changing shock to improve ride comfort as well as preventing the engine from being overloaded.

An example of this kind of transmission is disclosed in U.S. Pat. No. 4,641,548. The size of the this transmission described in the U.S. patent, however, becomes larger since it comprises a plurality of operating elements such as disks, pistons and the like. Furthermore, since the transmission is designed such that a plurality of shift mechanisms are arranged on a common axis in a series, the length of the transmission becomes longer. This makes it difficult to apply the transmission to automotive vehicles which have limited space for the mounting of parts. In addition, there is another problem in that it is not economical to apply the transmission to a practical vehicle side since the transmission is costly.

SUMMARY OF THE INVENTION

Therefore, the present invention is made in an effort to solve the above described problems of the prior transmission.

It is an object of the present invention to provide an infinitely variable speed transmission which is compact in size and has small number of operating elements so that the structure thereof is simple, and can be operated in the wide speed changing range.

It is another object of the present invention to provide an infinitely variable speed transmission which can infinitely change the speed, which can smoothly accomplish a speed changing from a medium speed range to a high speed range.

To achieve the above objects, the present invention provides an infinitely variable speed transmission, comprising:

a first speed changing mechanism for primarily changing rotational speed from an engine into a necessary rotation speed, including:
  a sun gear disposed on an input shaft which receives the power from the engine;
  a plurality of planet rollers which are disposed around the sun gear at a predetermined distance from each other, each planet roller having a truncated cone-shape and being revolvable around the sun gear and rotatable about the pivot axis of the planet roller.
  a carrier for connecting the planet rollers with each other and output the rotational torque changed in the planet rollers;
  a movable ring disposed to be circumscribed on outer peripheral lines of the planet rollers and movable by a moving means along the longitudinal direction of the planet rollers to change rotational speed of the planet rollers by varying a rotating diameter thereof to the movable ring so that the output speed transmitted through the carrier connecting the planet rollers with each other can be varied; and
a second speed changing mechanism for finally changing the output speed from the first speed changing mechanism into a necessary final output speed, including:
  a planetary gear unit having a sun gear, pinion gears and a ring gear mounted on an output shaft;
  a low speed control means having a first clutch for controlling a operation of the planetary gear unit; and
  a high speed control means having a second clutch mounted on the output shaft;
  the planetary gear unit and the second clutch of the high speed control means being parallel and directly connected with the carrier of the first speed changing mechanism; and
  the planetary gear unit being directly connected with the input shaft through the first clutch of the low speed control means.

And, a one way clutch is installed between the both friction plates of the first clutch to obtain smooth speed changing from a medium speed range to a high speed range.

According to the features of the present invention, the outer surface of the planet rollers contacting with the movable ring is defined to be parallel to the input shaft such that each distance from the input shaft to the circumscribed circle of the planet rollers is the same over the whole length of each planet roller.

Therefore, the movable ring can move along the longitudinal direction of the planet rollers in a state where the movable ring contacts the outer surface of the planet rollers with constant pressure.

As described above, by means of moving the movable ring along the longitudinal direction of the planet rollers, the revolving diameter of the planet rollers rotating in an inscribed state on the movable ring is varied linearly along the longitudinal direction of the truncated cone-shaped planet rollers, whereby the revolution speed of the carriers interconnecting the planet rollers is changed linearly even under the same rotational speed of the engine, thereby accomplishing the primary speed changing operation.

The revolution speed of the carrier becomes the rotational speed of the first speed changing mechanism.

According to another feature of the present invention, the low control means of the second speed changing mechanism is comprised of a planetary gear unit carried on an output shaft and a clutch for controlling the planetary gear unit, and the high speed control means thereof is comprised of a second clutch carried on the output shaft. Both one element of the planetary gear unit and the second clutch are connected with the carrier of the first speed changing mechanism to be parallel therewith. Another element of the planetary gear unit is also directly connected with the input shaft through the first clutch.

Therefore, the planetary gear unit is designed to have two input elements so that the rotational speed controlled in the first speed changing mechanism and rotational speed of the engine can be simultaneously inputted thereto.

Accordingly, by selection of the low speed control means or the high speed control means, the rotational speed which is primarily changed in the first speed changing mechanism is finally changed once more and differently transmitted to the output shaft according to the locking state of the first clutch or second clutch.

That is, in case where the first clutch is locked, rotational speed changed in the first speed changing mechanism and rotational speed of the engine can be simultaneously inputted to the planetary gear unit. Since the rotational speed changed in the first speed changing mechanism and the rotational speed of the engine are combined and changed in the planetary gear unit of the second speed changing mechanism and the changed result is transmitted to the output shaft, the output speed of the planetary gear unit is varied according to the variation of the rotational speed transmitted from the first speed changing mechanism to the planetary gear unit.

Accordingly, in the first speed changing mechanism which receives constant rotational speed of the engine, when the contacting position between the movable ring and the planet rollers is varied in accordance with the movement of the movable ring along the planet rollers, the output rotational speed of the first speed changing mechanism is also varied and this changed rotational speed is then transmitted to the planetary gear unit of the second speed changing mechanism and changed finally therein.

This operation of the planetary gear unit is realized by locking the first clutch so that the rotational speed of the first speed changing mechanism and the engine are simultaneously transmitted to the planetary gear unit of the second speed changing mechanism.

On the one hand, when the second clutch is locked instead of the first clutch, since no rotational speed of the engine is transmitted to the planetary gear unit through the first clutch, the planetary gear unit is set to be in an idling state and rotational speed transmitted from the first speed changing mechanism is directly transmitted to the output shaft through the second clutch.

Accordingly, since the rotational speed changed in the first speed changing mechanism is directly transmitted to the output shaft through the first clutch without being further changed, the rotational speed is higher than that when the first clutch is locked is outputted.

Therefore, when the second clutch is locked, the final output is operated at a higher speed than in the case where the first clutch is locked. Furthermore, as the output rotational speed of the first speed changing mechanism is increased, the speed of vehicle is gradually increased.

According to still another feature of the present invention, each planet roller can be made up of one truncated cone-shaped body or two truncated cone-shaped bodies which are combined such that large diameter end of the planer rollers are opposite to each other. In case of latter, the speed change range can be widened.

BRIEF DESCRIPTION OF THE INVENTION

The accompanying drawings, which are incorporated in and constitute a part of the specification, illustrate an embodiment of the invention, and, together with the description, serve to explain the principles of the invention:

FIG. 5A is a schematic diagram showing a state where the transmission depicted in FIG. 3 is in a first high speed level, which is same state as that of the third low speed level;

FIG. 5B is a schematic diagram showing a state where the transmissiondepicted in FIG. 3 is in a second high speed level;

FIG. 5C is a schematic diagram showing a state where the transmission depicted in FIG. 3 is in a third high speed level;

FIG. 14 is a table illustrating the combination of acting elements at each speed mode of the transmission according to the third embodiment of the present invention;

DETAILED DESCRIPTION OF THE PREFERRED EMBODIMENT

Reference will now be made in detail to the present preferred embodiment of the invention, an example of which is illustrated in the accompanying drawings. Wherever possible, the same reference numbers will be used throughout the drawings to refer to the same or like parts.

Figure 1:
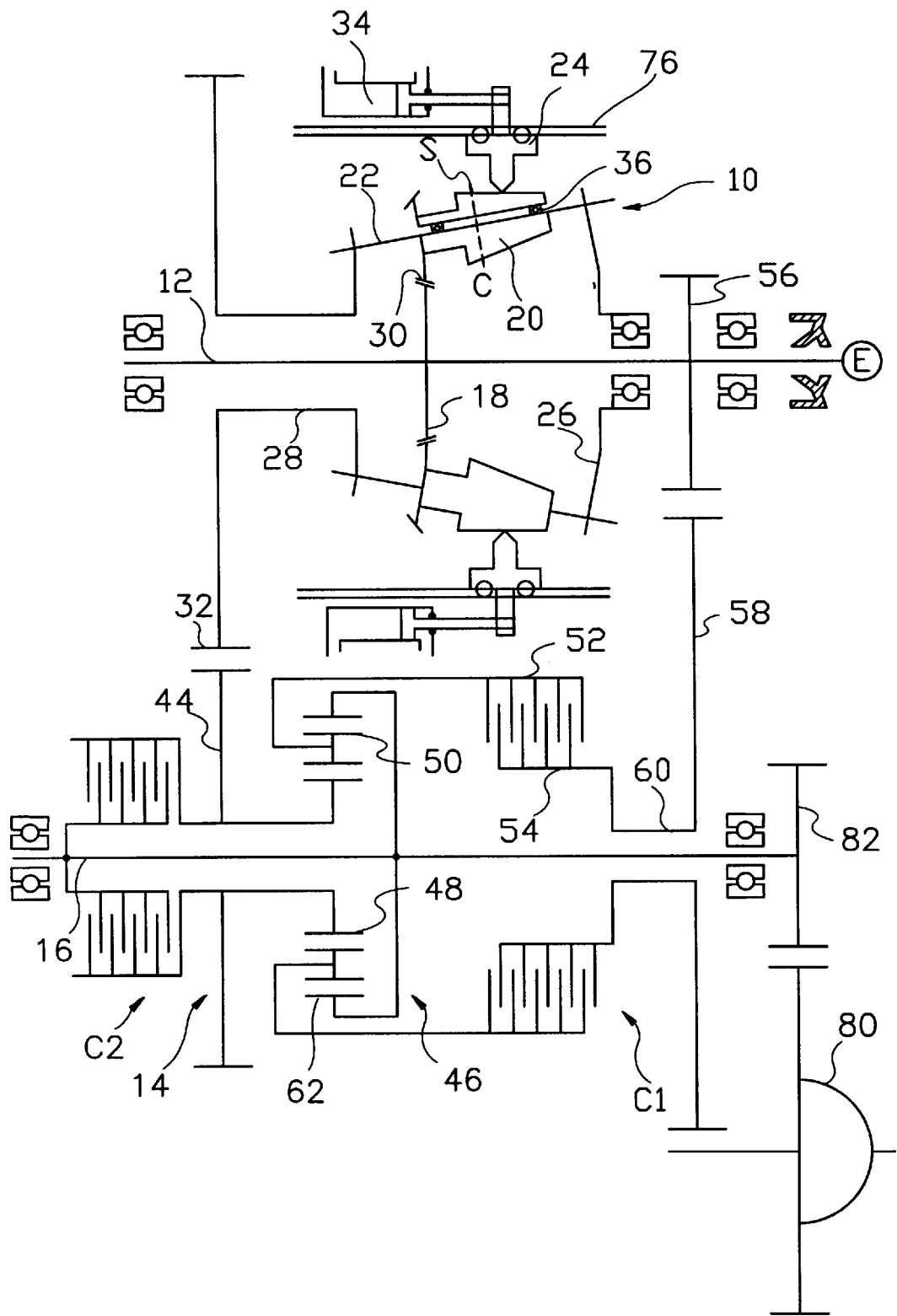
FIG. 1 is a schematic diagram illustrating an infinitely variable speed transmission in accordance with a first embodiment of the present invention.

FIG. 1 shows schematically an infinitely variable speed transmission in accordance with a first embodiment of the present invention. The transmission comprises a first speed changing mechanism 10 for primarily changing rotational speed from an engine E arranged on an input shaft 12 to which the rotational speed from the engine E is transmitted, and a second speed changing mechanism 14 meshing with the first speed changing mechanism I 0 to finally change the rotational speed changed in the first speed changing mechanism 10 and output it to an output shaft 16.

The first speed changing mechanism 10 includes a sun gear 18 splined on the input shaft 12, a plurality of planet rollers 20 which are disposed around the sun gear 18 at a predetermined distance from each other, each planet roller 20 having a truncated cone-shape and being revolvable around the sun gear 18 and rotatable about an pivot axis 22, a movable ring 24 disposed to friction-contact outer surface of the planet rollers 20 with a predetermined pressure and movable along the longitudinal direction of the planet rollers 20 to change revolution speed of the planet rollers 20, and support and output carriers 26 and 28 for interconnecting the planet rollers 20 and outputting revolution speed changed by the planet rollers 20.

Each planet roller 20 is provided with a gear 30 which meshes with the sun gear 18 so that 18 so that the planet roller 20 can receive rotational speed from the sun gear 18. The support and output carriers 26 and 28 respectively support both sides of the planet rollers 20 to be rotatable about a pivot axis 22 of the planet roller 20. The output carrier 28 is provided with a transfer drive gear 32 for transferring the changed rotational speed in the first speed changing mechanism 10 to the second speed changing mechanism 14.

The movable ring 24 is designed not to rotate but to reciprocate by a moving member 34, such as a hydraulic cylinder, a solenoid valve or a worm gear, along the longitudinal direction of the planet rollers 20. Accordingly, the planet rollers 20 which are inscribed on the movable ring 24 rotate about their pivot axes 22 and revolve around the movable ring 24.

Therefore, the movable ring 24 performs the same function as the ring gear of the common planetary gear unit such that it can receive power to serve as a supporting member for the planet rollers 20. As a result, as the supporting point for the planet rollers 20 which rotate about the pivot axis 22 in a constant speed by the rotational speed transformed from the sun gear 18 varies, and the revolution speed of the planet roller 20 around the movable ring 24 is also infinitely variable.

Figure 2:
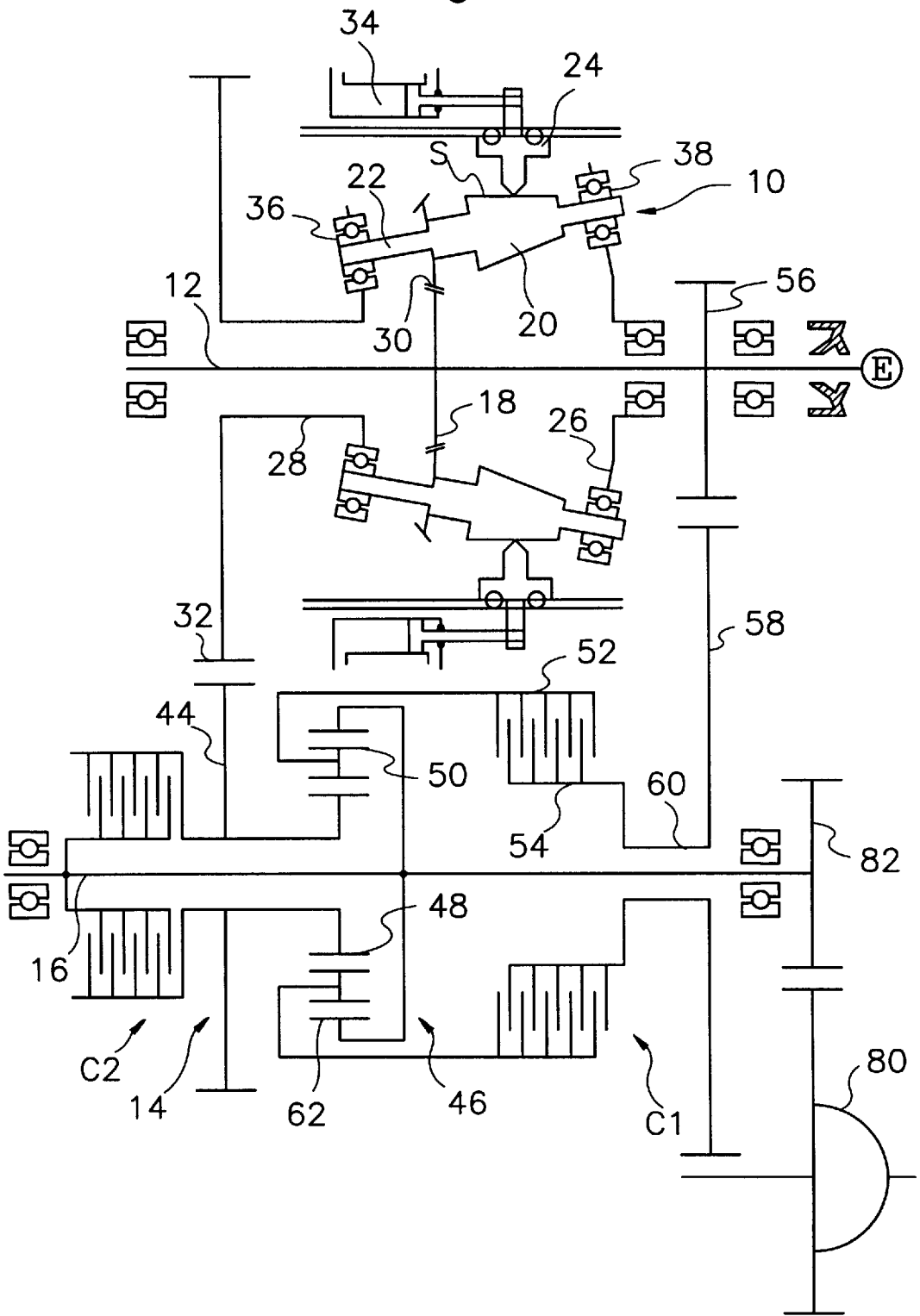
FIG. 2 is a schematic diagram illustrating a continuously variable transmission in accordance with a second embodiment of the present invention.

Furthermore, to make the movable ring 24 move along the outer surface S of the planet rollers 20 having an infinitely variable diameter along its longitudinal direction while contacting with a constant pressure, as shown in FIGS. 1 and 2, the planet rollers 20 are arranged such that their outer surface S are to be parallel with the input shaft 12.

The planet rollers 20 are major elements for the speed changing operation in the first speed changing mechanism 10, each planet roller 20 receiving power from the sun gear 18 rotates about the pivot axis 22 and revolves around the movable ring 24. At this point, as [the diameter of] the supporting diameter of the planet roller 20 supported by the movable ring 24 is varied, the rotational speed is also varied.

That is, since the supporting point where the movable ring 24 and the planet rollers 20 contact is varied as the movable ring 24 associated with the moving member 34 moves along the outer surface S of the truncated cone-shaped planet rollers 20 in its longitudinal direction in accordance with the expansion and contraction operations of the moving member 34, the revolving diameter of the planet roller 20 defined when the planet rollers 20 revolves with respect to the movable ring 24 is varied linearly. This linear variation of the revolving diameter makes the rotational speed of the first speed changing mechanism 10 with respect to the movable ring 24 vary linearly. As a result, the constant rotational speed from the engine is changed linearly.

On the assumption that load applied to a driving means is the same in a state where the engine E operates with a same condition in a specific point of the planet roller 20, the rotational speed transformed from the gear 30 of the planet roller 20 meshing with the sun gear 18 becomes constant to thereby make the rotational speed of the planet roller 20 constant.

However, since the operation diameter defined between the planet roller 20 and the movable ring 24 is varied as the movable ring 24 moves along the longitudinal direction of the planet roller 20, the revolving diameter of the planet rollers 20 is also varied. Accordingly, since the revolution speed of the planet rollers 20 is transformed through the pivot axis 22 to the output carrier 28 interconnecting the planet rollers 20, the rotational speed of the transfer drive gear 32 mounted on the output carrier 28 is to be varied while increasing and reducing.

Consequently, the linear variation of the output rotational speed of the first speed changing mechanism 10 makes the rotational speed of the output carrier 28 interconnecting the planet rollers 20 increase when the movable ring 24 is contacted with a large diameter portion of the planet rollers 20, and reduce when the movable ring 24 is contacted with a small diameter portion of the planet rollers 20. Therefore, as the movable ring 24 moves from the large diameter portion to the small diameter portion oft planet rollers 20, the rotational speed of the output carrier 28 and the, transfer drive gear 32 connected with the output carrier 28 becomes decreased.

On the one hand, in the first speed changing mechanism 10 as described above, the arrangement state of the pivot axis 22 of the planet rollers 20 can be variably mounted. That is, according to a first embodiment as shown in FIG. 1, the pivot axis 22 of the planet roller 20 can be separated from the body of the planet roller 20 and a bearing 36 is mounted between the planet roller 20 and the pivot axis 22 to improve the rotating performance there between.

According to a second embodiment as shown in FIG. 2, the planet roller 20 is designed to be integral with the pivot axis 22 and bearings 36 and 38 are respectively mounted on opposite ends of the pivot axis 22.

This integral design makes the planet roller 20 longer than that of the first embodiment, resulting in widening the variable speed range.

Figure 3:
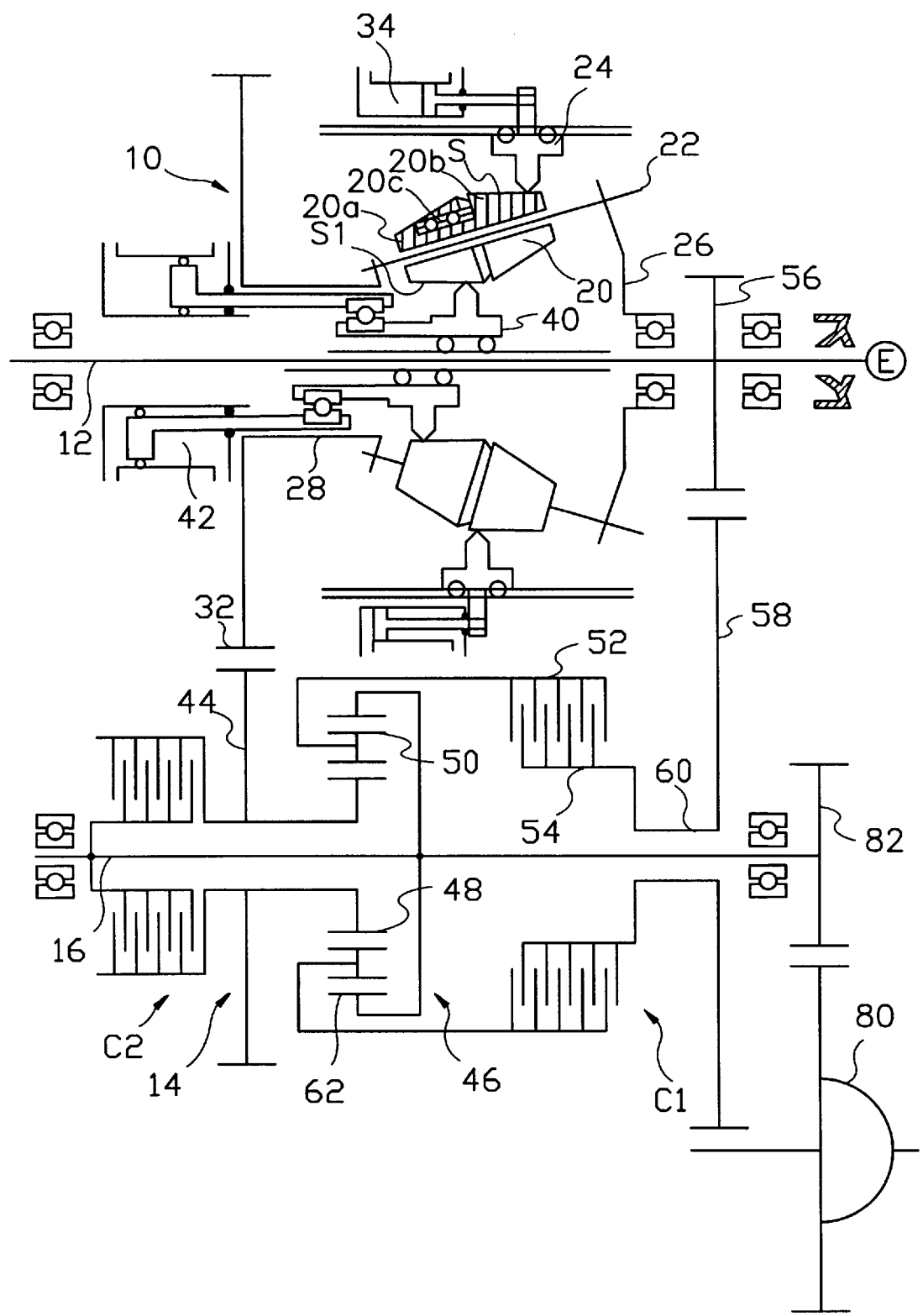
FIG. 3 is a schematic diagram illustrating an infinitely variable speed transmission in accordance with a third embodiment of the present invention.
Figure 4:
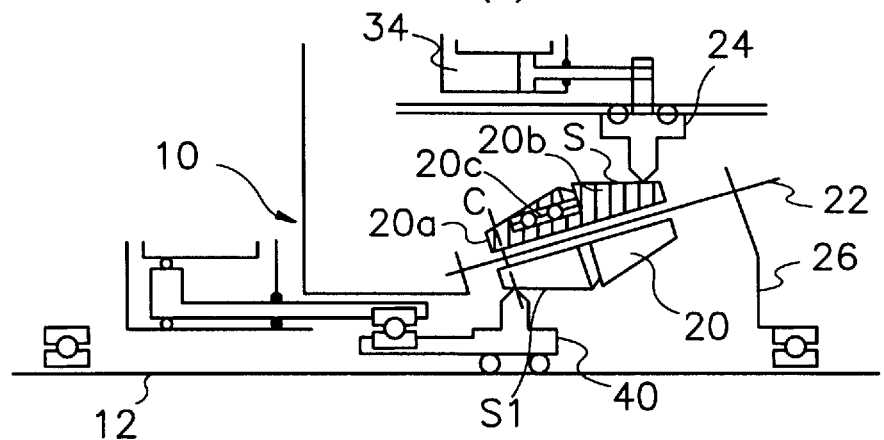
FIG. 4A is a schematic diagram showing a state where the transmissiondepicted in FIG. 3 is in a first low speed level outputted from a neutral state.
FIG. 4B is a schematic diagram showing a state where the transmission depicted in FIG. 3 is in a second low speed level.
FIG. 4C is a schematic diagram showing a state where the transmissiondepicted in FIG. 3 is in a third low speed level.
Figure 4B:
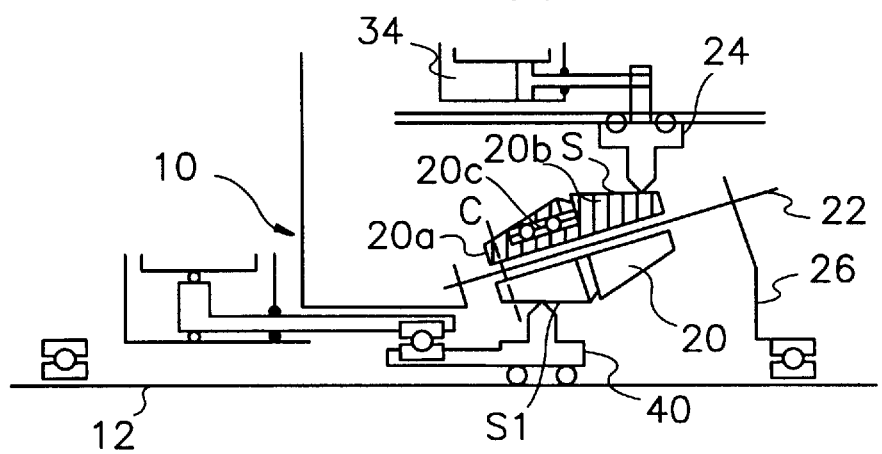
Figure 4C:
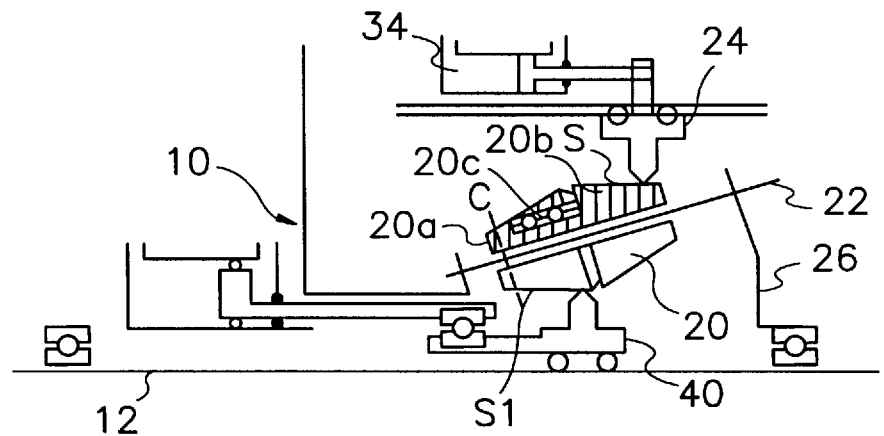

According to a third embodiment as shown in FIGS. 3 to 5, each planet roller 20 is made up of two truncated cone-shaped bodies while the planet roller 20 disclosed in the first and second embodiments is made up of one truncated cone-shaped body. That is, the planet roller 20 is made up of two truncated cone-shaped bodies 20a and 20b which are combined such that they are symmetrically faced with each other at their large diameter portions. In the latter case, the speed changing range can be widened.

A bearing 20c is mounted between the two truncated cone-shaped bodies 20a and 20b for smooth sliding of the body 20b inside of the other body 20a when the pressure form the movable ring 24 is applied to the body 20b, as the movable ring 24 moves along the surface of the body 20b.

The two truncated cone-shaped bodies always rotate in one body and are arranged to be movable toward each other. For this movement, the two truncated cone-shaped bodies 20a and 20b may be coupled by interposing a coupling member such as a ball spline there between.

When using the two cone-shaped bodies 20a and 20b as a means for transferring power of the engine, a movable sun ring 40 is used.

The sun ring 40 is splined on the input shaft 12 to rotate therewith and is movable in a longitudinal direction of the input shaft 12. And, like the movable ring 24, the movable sun ring 40 also tightly contacts the inner surface S1 of each planet roller 20 with a predetermined pressure.

A moving member 42 such as a hydraulic cylinder, a solenoid valve, or a worm gear, is used for moving the movable sun ring 40.

In the first speed changing mechanism using the two truncated cone-shaped bodies 20a and 20b as the planet roller 20, one body 20a is circumscribed on the movable sun ring 40 and the other body 20b is inscribed on the movable ring 24. The movable sun ring 40 and the movable ring 24 respectively move by the moving members 34 and 42 along the longitudinal directions of the bodies 20a and 20b while contacting the bodies 20a and 20b both having a variable diameter. For enabling this, the bodies 20a is arranged such that the surfaces S which is respectively designed to be in contact with the movable sun ring 40 and the movable ring 24 are designed respectively to be parallel to the input shaft 12.

Accordingly, when the input shaft 12 rotates to thereby rotate the sun ring 40, the rotational speed of the movable sun ring 40 is transformed to the planet roller 20 by tight contacting force between the movable sun ring 40 and the body 20a[6a], thereby rotating the planet roller 20. At this point, since the movable ring 24 fixed in a rotating direction supports the planet roller 20, the planet roller 20 rotates about the pivot axis 22 which is inserted through the planet roller 20 and revolves around the movable ring 24.

The revolution speed of the planet roller 20 ring 241 is varied in accordance with the positions of the movable ring 24 and the movable sun ring 40, thereby accomplishing the speed changing operation.

The speed changing operation of the planet roller 20 is linearly realized as the movable sun ring 40 and the movable ring 24 moves respectively along the bodies 20a and 20b of the planet roller 20 by the moving members 34 and 42 respectively.

That is, when the movable sun ring 40 moves along the inner surface of the planet rollers 20 in the longitudinal direction in a state where the position of the movable ring 24 is fixed, a circular diameter defined where the movable sun ring 40 is to be in contact with the body 20a having a variable diameter is to be varied.

This operation will be described more in detail hereinafter referring to FIG. 1 and FIG. 3.

When the movable sun ring 40 is displaced toward the large diameter portion of each cone-shaped body 20a, since the supporting point with respect to the movable ring 24 is fixed, the revolution speed of each planet roller 20 becomes reduced,, whereby the rotational speed of the carrier 28 becomes reduced.

On the contrary, when the movable sun ring 40 is displaced toward the small diameter portion of each cone-shaped body 20a, since the rotating diameter of each planet roller 20 becomes reduced, resulting in increasing the revolution speed of each planet roller 20. As a result, the revolution speed of the planet rollers 20 around the movable ring 24 is to be increased.

Further, when the position of the movable sun ring 40 is fixed and the movable ring 24 is displaced along each cone-shaped body 20b of the planet rollers 20 while being in contact therewith, the rotational speed transferred from the movable sun ring 40 to the cone-shaped body 20a is constant, but the cone-shaped body 20b of the planet rollers 20, is increased or decreased in proportion to the operating contacting diameter of the movable ring 24, thereby accomplishing the speed changing operation. This variable speed is transmitted to the second speed changing mechanism 14 through the output carrier 28.

During the speed changing operation as described above, as the operating diameters of the planet roller 20a and 20b are linearly varied, the speed changing is also linearly accomplished. Consequently, the transmission according to the invention makes it possible to linearly vary the rotational speed at the constant engine RPM.

The first speed change mechanism 10 in accordance with the third embodiment, the speed changing operation is accomplished through both cone-shaped body 20a and 20b, so that the whole speed changing range is widened.

The speed second changing mechanism 14 which receives the rotational speed firstly changed in the first speed changing mechanism 10 and varies it secondly, comprises a transfer driven gear 44 mounted on the output shaft 16, a low speed control means including a planetary gear unit 46 and a first clutch C1, and a high speed control means having a second clutch C2 wherein the transfer driven gear 44 meshes with the transfer drive gear 32 mounted on the output carrier 28 of the first speed changing mechanism 10 thereby transmitting the rotational speed firstly changed in the first speed changing mechanism 10 into the second speed changing mechanism 14.

In addition, the transfer driven gears 44 are parallel and connected with a planetary gear unit 46 constituting the low speed control means and the second clutch C2 constituting the high speed control means respectively. There are two types of connections between the transfer driven gear 44 and the planetary gear unit 46 in the present invention and the shift operation is changed according to the type of connection therebetween.

Firstly, as shown in FIGS. 1 to 13, the first type of the second speed changing mechanism 14 according to the present invention is accomplished such that the sun gear 48 of the planetary gear unit 46 is directly connected with the transfer driven gear 44, pinion gears 50 are connected with one friction plate 52 of the first clutch C1, the other friction plate 54 of the first clutch C1 is directly connected with a high speed gear 56 disposed on the input shaft 12 through a carrier 60 and direct connection gear 58, and a ring gear 62 of the planetary gear unit 46 is connected with the output shaft 16.

Accordingly, the planetary gear unit 46 in accordance with the first type of the second speed changing control mechanism 14 is constructed such that an input end for receiving driving power includes two elements, the sun gear 48 and the pinion gears 50, and an output end is the ring gear 62 connected with the output shaft 16.

Therefore, the rotational speed firstly changed in the first speed changing mechanism 10 thereby inputted into the sun gear 48 of the planetary gear unit 46, and the rotational speed of engine E inputted into the pinion gears 50 of the planetary gear unit 46 through the high speed gear 56, the direct connection gear 58 and the first clutch C1 from the input shaft 12 are combined and varied in the planetary gear unit 46, and the final varied rotational speed is transmitted to the output shaft 16 through the ring gear 62.

Figures 6, 7:
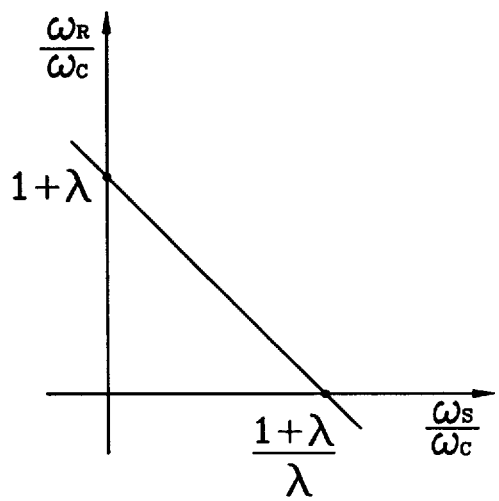
FIG. 6 is a table illustrating the combination of acting elements at eachspeed mode of the transmission according to the third embodiment of the present invention.
FIG. 7 is a graphical illustration of an equation of speed outputted from the planetary gear unit depicted in FIG. 3.

Among the first type of the transmission according to the present invention, the speed changing process of the continuously variable transmission in accordance with the first embodiment having only one planet roller 20, as shown in FIG. 1, will be in detail described as follows. At this point, the combination of each operating element for accomplishing each speed changing stage is shown in FIG. 6.

Before concretely describing the process of accomplishing the infinitely variable speed operation with the transmission according to the present invention, features in accordance with a structural condition thereof will be described to help the infinitely speed changing process of the transmission in accordance with the present invention to be understood.

The infinitely variable speed transmission of the present invention is constructed such that the rotation speed of the engine E is firstly changed in the first speed changing mechanism 10 and the result of the first variable speed is transmitted to the second speed changing mechanism 14 thereby accomplishing the final variable speed. The variable speed process from a low speed range to a medium speed range is accomplished by locking the first clutch C1. The variable speed process from a medium speed range to a high speed range is accomplished by disengaging the first clutch C1 and locking the second clutch C2.

Further, an equation of specific speed relation according to the first type of the second speed changing mechanism 14, in which the input ends of the planetary gear unit 46 receiving the power when the first clutch C1 is locked are composed of two elements, the sun gear 48 and pinion gears 50, is accomplished.

That is, as described above, the equation of speed relation obtained from the planetary gear unit 46 wherein the varied power in the first speed changing mechanism 10 is inputted into the sun gear 48 the driving power of the engine E is simultaneously inputted into the pinion gears 50 receiving the changed output is defined by, $$(1+\lambda)\omega_C = \lambda\omega_S + \omega_R \quad (1)$$

where, $\lambda$ = Nos. of teeth of the sun gear, $\omega_C$ = Nos. of rotations of the carrier connecting the pinion gears, $\omega_S$ = Nos. of rotations of the sun gear, $\omega_R$ = Nos. of rotations of the ring gear.

The result is, $$\omega_R/\omega_C = -\lambda\omega_S/\omega_C + 1 + \lambda \quad (2)$$

In FIG. 7, the equation is graphically illustrated. As shown in the graph, in the planetary gear unit 46 having the pinion gears 50 and the sun gear 48 as input end, and the ring gear 62 as output end, the rotational speed $\omega_C$ of the carrier which is same as engine RPM is constant, whereby as the speed $\omega_S$ of the sun gear 48 decreases, the speed $\omega_R$ of the ring gear 62 is increased.

Further, if the speed ratio of the sun gear 48 with respect to the pinion gears 50, that is, $\omega_S/\omega_C$ is more than $(1+\lambda)/\lambda$, $\omega_R/\omega_C$ is a negative value. This means that as the speed $\omega_C$ of the carrier connected to the pinion gears 50 is the common denominator, if the speed $\omega_S$ of the sun gear 48 increased more than a predetermined value, the value of $\omega_R$ is negative, and this means that the ring gear 62 rotates reversely. This can be easily understood from the graph in FIG. 7.

The planetary gear unit 46 employed on the first type of the second speed changing mechanism 14 according to the present invention has the features as described above. The variable speed process employing the planetary gear unit 46 will be concretely described as follows.

Neutral Mode (Initial Mode)

A neutral state of the infinitely variable speed transmission according to the invention is accomplished by 2 processes. A first operating process is that, in case that the first clutch C1 and second clutch C2 mounted on the output shaft 16 are disengaged. In this case though the rotational speed is transmitted from the first speed changing mechanism 10 to the transfer driven gear 44 through the transfer drive gear 32 mounted on the output carrier 28 of the first speed changing mechanism 10, because the first clutch C1 and second clutch C2 are respectively disengaged, the rotational speed is transmitted from the first speed changing mechanism 10 is not transmitted to the second speed changing mechanism 14 so that the planetary gear unit 46 is idle whereby the power is not transmitted to the output shaft 16.

Accordingly, in case that the first and second clutches C1 and C2 are disengaged, the power is not transmitted to the output shaft 16 thereby being in the neutral state.

On the other hand, the second operating process for accomplishing the neutral state is that, in a state where the second clutch C2 is disengaged and the first clutch C1 for a low speed range is engaged, and the movable ring 24 is positioned in the neutral line C designated as a dotted-line in FIG. 1 adjacent to a vertical hem in a large diameter portion of the planet roller 20. In this case a rotational speed firstly changed in the first speed changing mechanism 10 is inputted into the sun gear 48 of the planetary gear unit 46 through the transfer drive gear 32 and transfer driven gear 44, and at the same time through the first clutch C1 being engaged, the rotational speed of the input shaft 12 is inputted into the pinion gears 50 of the planetary gear unit 46 through the high speed gear 56, direct connection gear 58 and the first clutch C1.

The output speed from the first mechanism when the movable ring 24 is positioned on the neutral line C of the planet roller 20 is same as the engine RPM. Therefore, the rotational speed of the sun gear 48 is equal to that of the pinion gears 50 so that the sun gear 48 and the pinion gears 50 rotates together and does not transmit the rotational speed to the ring gear 62.

Accordingly, the ring gear 62 does not transmit the rotational speed to the output shaft 16 thereby accomplishing the neutral state that the output shaft 16 is not driven thereby.

That is, in case that the first clutch C1 is locked and the movable ring 24 is placed in the neutral line C, even if the rotational speed firstly changed in the first speed changing mechanism 10 is inputted into the sun gear 48 of the planetary gear unit 46 through the transfer drive gear 32 and the transfer driven gear 44, and the rotational speed of the engine E is transferred into the pinion gears 50 of the planetary gear unit 46 through the high speed gear 56, direct connection gear 58 and clutch C1 mounted on the input shaft 12.

In this state, the sun gear 48 and pinion gears 50 are rotated same rotational speed and the rotational speed from the planetary gear unit 17 is not transmitted to the ring gear 62 around the pinion gears 50. Accordingly, the ring gear 62 does not drive the output shaft 16 thereby being in the neutral state.

Further, in state that the clutch C1 is locked, if the movable ring 24 moves from the neutral line C to a small diameter portion of the planet roller 20, the forward driving is accomplished, and if it moves from the neutral line C to a large diameter portion of the planet roller 20, the reverse driving is accomplished. This forward and reverse direction converting process will be described later in detail.

Low-To-Medium Speed Mode

In a state of the neutral state described above, when the first clutch C1 is locked and the movable ring 24 moves from the neutral line C to the small diameter portion thereof, the operating diameter of the planet roller 20 contacted and supported to the movable ring 24 gradually decreases. Because the rotational speed of the planet roller 20 with respect to the movable ring 24 decreases as much as the operating diameter of the planet roller 20 decreases, if the operating diameter of the planet roller 20 decreases, the rotational speed of the output carrier 28 which connects a plurality of the planet rollers 20 to each other and revolves with the planet roller 20 is decreased too. Therefore the rotational speed inputted into the sun gear 48 of the planetary gear unit 46 from the first speed changing mechanism 10 through the output carrier 28, transfer drive gear 32 and transfer driven gear 44 will decrease simultaneously.

On the contrary, the rotational speed transmitted directly from the input shaft 12 into the pinion gears 50 through the high speed gear 56, direct connection gear 58 and first clutch C1 is not changed between the high speed gear 56 and direct connection gear 58, so that the pinion gears 50 rotates relatively fast around the sun gear 48 which is a center member.

Accordingly, as shown in the equation (1) and the graph of FIG. 7, as the rotational speed $\omega_S$, of the sun gear 48 is gradually reduced, the rotational speed of the sun gear 48 is compounded with the rotational speed of the pinion gears 50, and the result rotational speed outputted through the ring gear 62 gradually increases. And the rotational speed of the output shaft 16 connected with the ring gear 62 increases.

Therefore, as the movable ring 24 moves toward the small diameter portion of the planet roller 20, the rotational speed transmitted to the output shaft 16 through the ring gear 62 gradually increases.

This is the variable speed process of the first type of the infinitely variable speed transmission according to the invention from the low speed range to medium speed range. As described above, the diameter of the planet roller 20 contacting with the movable ring 24 is linearly variable so that the rotational speed outputted through the planetary gear unit 46 connected to the planet roller 20 gradually increases. Consequently, the speed changing from the low speed range to medium speed range is continuously accomplished.

Medium-to-High Speed Mode

When the speed changing from the low speed range to the medium speed range is accomplished by the above described processes, the movable ring 24 is positioned on the end of the small diameter portion of the planet roller 20. In this state, if the first clutch C1 is released and the second clutch C2 is locked at the same time, because the first clutch C1 is released, the rotary power is not transmitted from the input shaft 12 into the pinion gears 50 of the planetary gear unit 46, and the sun gear 48 of the planetary gear unit 46 meshed with the transfer driven gear 44 continuously rotates.

However, as the pinion gears 50 does not rotate, the planetary gear unit 46 is set to be in an idling state on the whole so that rotational speed is not transmitted to the ring gear 62.

In this state, if the second clutch C2 for high speed is locked, the rotational speed of the first speed changing mechanism 10 is directly transmitted into the output shaft 16 through the second clutch C2 without changing. If the rotational speed outputted from the first speed changing mechanism 10 is increased, the rotational speed of the output shaft 16 receiving the driving power through the second clutch C2 is increased in the same ratio thereof.

Accordingly, as described above, as the movable ring 24 moves from the end of the small diameter portion of the planet rollers 20 to that of the large diameter portion of the planet roller 20, the rotational speed of the carrier 28 connecting a plurality of the planet rollers 20 to each other becomes increased, whereby this increased rotational speed is directly transmitted into the output shaft 16 through the second clutch C2 thereby increasing the rotational speed of the second speed changing mechanism 14.

In the process from the medium speed range to the high speed range as described above, since the rotational speed outputted from the first speed changing mechanism 10 is directly transmitted into the output shaft 16, other complicated speed changing processes which are caused by a intermediate shifting means, for instance, additional planetary gear unit 46 in the low speed state, is not needed.

Accordingly, in case of speed changing from the medium speed range to the high speed range, only a process where the rotational speed outputted from the first speed changing mechanism 10 is transmitted through the second clutch C2, is accomplished.

Also, in the process of speed changing to the high speed range, since the diameter of the planet roller 20 linearly increases, the speed of the output shaft 16 rotated by receiving the output of the planet roller 20 gradually increases thereby accomplishing the continuous speed changing in the high speed range.

Reverse Mode

As is described in detail, the operating processes in accordance with the structural features of the infinitely variable transmission according to the present invention, and as shown in FIG. 6, to reverse the output shaft 16 of the transmission, if the first clutch C1 is locked in a state of releasing the second clutch C2, as the speed changing processes to the medium speed range already described above, the rotational speed changed in the first speed changing mechanism 10 is inputted into the sun gear 48 of the planetary gear unit 46 and the rotational speed of the input shaft 12 is directly inputted into the pinion gears 50 of the planetary gear unit 46 through the high speed gear 56, the direct connection gear 58 and the first clutch C1.

Accordingly, as shown in the equation (2), since the speed $\omega_C$ of the pinion gears 50 of the planetary gear unit 46 is the common denominator, if the speed $\omega_s$ of the sun gear 48 is increased to the predetermined value so that the value of $\omega_s/\omega_C$ is larger than that of larger than that of $(1+\lambda)/\lambda$, the value of $\omega_s/\omega_C$ is negative.

Consequently, the rotational speed is determined by the speed of the sun gear 48, and the critical line between the positive rotation and negative rotation of this sun gear 48 becomes the neutral line C indicated on the planet roller 20. Accordingly, when the movable ring 24 moves to the large diameter portion over the neutral line C, the rotational speed of the transfer drive gear 32 provided in the output carrier 28 supporting the planet rollers 20 increases in accordance with the principle described above so that the rotational speed of the sun gear 48 of the planetary gear unit 46 connected with the transfer drive gear 32 is increased more than the critical value thereby reversing the ring gear 62 of the planetary gear unit 46 as described above.

On the other hand, in the case of high speed positive rotation, also the movable ring 24 moves over the neutral line C indicated on the planet roller 20. In the state of the high speed positive rotation, however, the movable ring 24 moves to the largest diameter portion over the neutral line C thereby accomplishing the speed changing to the highest speed and the output shaft 16 is not reversed as the reverse range. This results in the case of the high speed positive rotation, the second clutch C2 is locked and the first clutch C1 is released, but in the case of reverse rotation, the first clutch C1 is locked and the second clutch C2 is released, so that the state of the positive rotation is not the same as that of the reverse rotation.

That is, though the movable ring 24 moves to the largest diameter portion of the planet roller 20, if the clutch C1 is released and the second clutch C2 is locked, the planetary gear unit 46 does not operate so that the equations (1) and (2) do not apply. Since the rotational speed changed in the first speed changing mechanism 10 is directly transmitted into the output shaft 16 through the second clutch C2, even if the movable ring 24 moves to the large diameter portion of the planet roller 20 during the forward high speed range, the output speed transmitted to the output shaft 16 increases high.

Therefore, the infinitely variable speed transmission according to the present invention is designed such that the forward and reverse modes can be mutually converted by controlling only the rotational speed outputted from the first speed changing mechanism 10 without using a special direction converting means, such that the conversion between the forward drive and the reverse drive can simply smoothly be realized and the structure of the transmission becomes compact and simple.

On the one hand, the transmission according to the third embodiment of the present invention depicted in FIG. 3 is different in its speed changing operation from those of the first and second embodiments, since the movable sun ring 40 and the movable ring 24 can be respectively moved by the moving members 42 and 34.

However, since the power input and output elements for the planetary gear unit 46 constituting the second speed changing mechanism 14 are the same as those of the first and second embodiment, the basic operating concept is the same as those of the first and second embodiments, in which the speed changing operation is accomplished as follows:

Neutral Mode (Initial Mode)

In the third embodiment, the neutral mode can be achieved in two states. Likewise the first embodiment, one is a state where the first and second clutches C1 and C2 are released. In this state, the rotational speed from the first speed changing mechanism 10 cannot be transmitted to the second speed changing mechanism 14, thereby accomplishing the neutral mode.

The other is a state where the second clutch C2 is released while the first clutch C1 is locked, furthermore the movable sun ring 40 is positioned on the neutral line C proximal to the small diameter portion of the cone-shaped body 20a and the movable ring 24 is positioned on the front end of the large diameter portion of the cone-shaped body 20b as shown in FIG. 3.

In this state, the rotational speed primarily changed in the first speed changing mechanism 10 is inputted to the sun gear 48 of the planetary gear unit 46 through the transfer drive and transfer driven gears 32 and 44. And at the same time, since the rotational speed of the input shaft 12 is directly inputted to the pinion gears 50 of the planetary gear unit 46 through the high speed gear 56, direct gear 58, and first clutch C1, the rotational speed of the sun gear 48 and the rotational speed of the pinion gears 50 becomes the same as each other. Accordingly, power is not transmitted to the ring gear 62, thereby realizing the neutral mode.

In addition, in a state where the first clutch C1 is locked and the position of the movable ring 24 is fixed, when the movable sun ring 40 is moved from the neutral line C to the large diameter portion of the cone-shaped body 20a, the speed changing operation is realized positively, and when the movable sun ring 40 is moved from the neutral line C to the small diameter portion of the cone-shaped body 20a, the speed changing operation is achieved negatively. This operation will be described in detail in the following low-to-medium speed mode.

Low-To-Medium Speed Mode

At the neutral mode as described above, as the movable sun ring 40 moves toward the largest diameter portion of the cone-shaped body 20a in a state where the first clutch C1 is locked and the movable ring 24 is moved toward the largest diameter portion of the cone-shaped body 20b, the diameter of the cone-shaped body 20a being in contact with the movable sun ring 40 is gradually increased.

As a result, the rotational speed of the planet rollers 20 inscribed on the movable ring 24 is gradually reduced, and this reduced rotational speed is transmitted to the sun gear 48 of the planetary gear unit 46 constituting the second speed changing mechanism 14 through the transfer drive and transfer driven gears 32 and 44.

As described above, as the rotational speed outputted from the first speed changing mechanism 10 is gradually reduced, while the sun gear 48 of the planetary gear unit 46 gradually rotates slowly, since the constant rotational speed is directly transmitted from the input shaft 12 to the pinion gears 50, as can be known from the equation (2) and graph in FIG. 7, the rotational speed of the ring gear 62 disposed around the pinion gears 50 and rotating by receiving the rotational speed from the pinion gears 50 is gradually increased.

After the movable sun ring 40 is completely moved toward the large diameter portion of the cone-shaped body 20a as the movable ring 24 moves from the large diameter portion to the small diameter portion of the cone-shaped body 20b, the rotational speed of the planet rollers 20 which rotate by receiving the constant rotational speed from the movable sun ring 40 is gradually reduced, such that the output rotational speed from the first speed changing mechanism 10 is also reduced.

Accordingly, since the sun gear 48 of the planetary gear unit 46 receives the reduced speed from the first speed changing mechanism 10 and rotates with the further reduced speed, as shown from the equation (2) and graph in FIG. 7, as the rotational speed of the sun gear 48 is gradually reduced, the output rotational speed from the ring gear 62 becomes increased.

Finally, when the movable ring 24 of the first speed changing mechanism 10 is positioned on the smallest diameter portion of the cone-shaped body 20b, the transmission becomes the medium mode.

Therefore, during the transmission changes the output rotational speed from the low speed to the medium speed, since the rotating diameters of each cone-shaped bodies 20a and 20b are linearly varied while the movable sun ring 40 and the movable ring 24 respectively contacting therewith move along the longitudinal directions thereof, the output rotational speed from the planetary gear unit 46 connected to the planet rollers 20 is gradually increased so that the speed change from the low speed to the medium speed can be infinitely realized.

Medium-to-High Speed Mode

When the output rotational speed reaches to the medium speed as described above, as shown in FIG. 5A, the movable sun ring 40 is to be positioned on the largest diameter portion of the cone-shaped body 20a, while the movable ring 24 is to be positioned on the smallest diameter portion of the cone-shaped body 20b.

At this state, after releasing the first clutch C1 and locking the second clutch C2, as shown in FIGS. 5A and 5B, as the movable ring 24 is moving from the small diameter portion to the large diameter portion of the cone-shaped body 20b and the movable sun ring 40 is moving from the large diameter portion to the small diameter portion of the cone-shaped body 20a, the rotational speed in the planet roller 20 is gradually increased, and this increased rotational speed is transmitted to the output shaft 16 through the second clutch C2 from the first speed changing mechanism 10.

At this point, as described in the first embodiment, the planetary gear unit 46 is set to be in an idling state so that the rotational speed cannot be transmitted to the ring gear 62.

Furthermore, since the rotational speed changed in the first speed changing mechanism 10 is transmitted to the output shaft 16 through the second clutch C2 without further speed change, if the rotational speed outputted from the first speed changing mechanism 10 is increased, the rotational speed of the output shaft 16 is also increased in the same ratio.

That is, as in the first embodiment, as the operating diameter of the planet rollers 20 revolving around the movable ring 24 is increased, the revolution speed thereof is increased, whereby the rotational speed outputted from the first speed changing mechanism 10 through the transfer drive gear 32 to the second speed changing mechanism 14 is to be increased.

At this point, in a state where the movable sun ring 40 is fixed on a position of the cone-shaped body 20a, the movable ring 24 is moved from the large diameter portion to the small diameter portion of the cone-shaped body 20b.

When the movable ring 24 is positioned on the smallest diameter portion of the cone-shaped body 20b, the movable sun ring 40 is to be moved from the small diameter portion to the large diameter portion of the cone-shaped body 20a. At this point, since the operating diameter of the movable sun ring 40 transmitting rotational speed is fixed, the operating diameter of the planet roller 20 receiving the rotational speed from the movable sun ring 40 is reduced to thereby increase the rotational speed of the planet rollers 20. As a result, when the rotational speed of the planet rollers 20 around the movable ring 24 is increased so that the output rotational speed of the first speed changing mechanism 10 is gradually increased.

Reverse Mode

The reverse mode of the transmission according to the third embodiment is similarly realized to the first and second embodiments, except that the position where the movable sun ring 40 is in contact with the cone-shaped body 20a at the neutral line C where the forward mode and the reverse mode are mutually converted, are different from those of the first and second embodiments.

That is, to reversely rotate the output shaft 16 of the transmission according to the third embodiment, if the output rotational speed from the first speed changing mechanism 10 through the transfer drive gear 32 is increased over a critical value in a state where the second clutch C2 is released and the first clutch C1 is locked, the output rotational speed changed in the planetary gear unit 46 of the second speed changing mechanism 14 becomes negative (−).

In other words, when the rotational speed of the transfer drive gear 32 is increased over a critical value, likewise at the medium-to-high forward speed mode, as the movable sun ring 40 is moved forward the smallest diameter portion of the cone-shaped body 20a in a state where the movable ring 24 is positioned on the largest diameter portion of the cone-shaped body 20b, the output rotational speed from the planet roller 20 becomes to be increased. At this point, once the movable sun ring 40 is moved over a predetermined position, the rotational speed inputted into the planetary gear unit 46 of the second speed changing mechanism 14 becomes to be over a critical rotational speed, the transmission is converted from the forward mode into the reverse mode through the neutral mode.

Accordingly, in the third embodiment, when the movable sun ring 40 is moved passing the neutral line C proximal to the smallest diameter portion of the cone-shaped body 20a, the rotating direction outputted from the second speed changing mechanism 14 becomes to be converted into the reverse direction.

Figure 8:
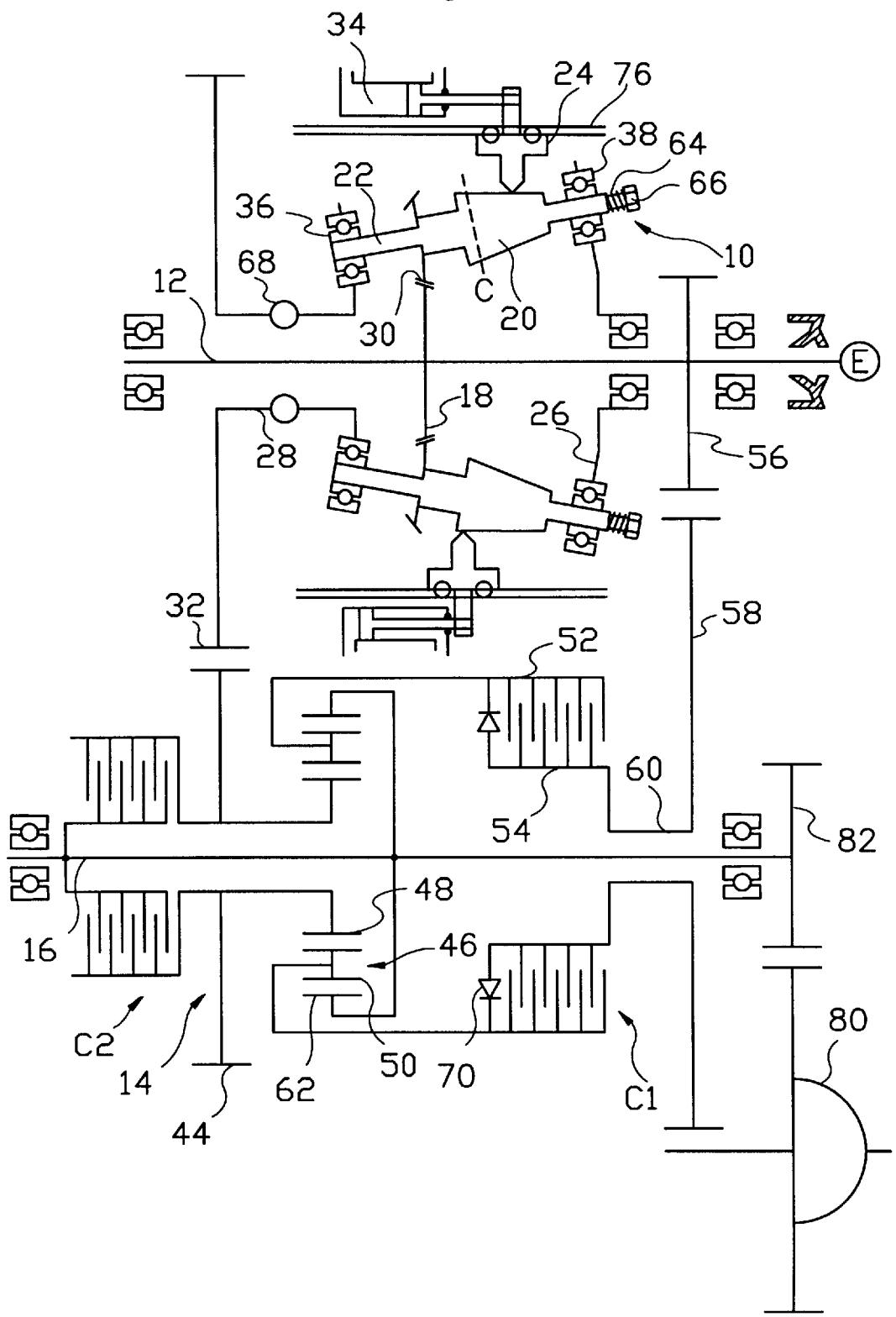
FIG. 8 is a schematic diagram illustrating an infinitely variable speed transmission in accordance with a fourth embodiment of the present invention.

FIG. 8 shows an infinitely variable speed transmission according to the fourth embodiment of the present invention. The transmission according to the fourth embodiment is similar to the first, second, and third embodiments except that the following additional elements are added thereto.

First, a spring 64 is mounted on a front end of the pivot axis 22 rotatably supporting the planet rollers 20 to elastically bias the planet roller 20. Further, there is provided a pre-load nut 66 to control frictional force between the planet roller 20 and the movable ring 24.

Second, a load cam 68 is mounted on the output carrier 28 of the first speed changing mechanism 10 to absorb excessive load applied to the second speed changing mechanism 14, thereby preventing the excessive resistance from transmitting to the planet rollers 20.

Third, a one way clutch 70 is mounted in parallel between the friction plate 52 of the first clutch C1 and the friction plate 54 connected to the direct gear 58.

As described above, by providing some additional elements to the transmission, the efficiency of the infinitely variable transmission can be increased. That is, when a big load is applied to the output gear 72 of the second speed changing mechanism 14, to prevent the big load from directly being transmitted to the planet rollers 20, the load cam 68 absorbs some of the big load.

Figure 9:
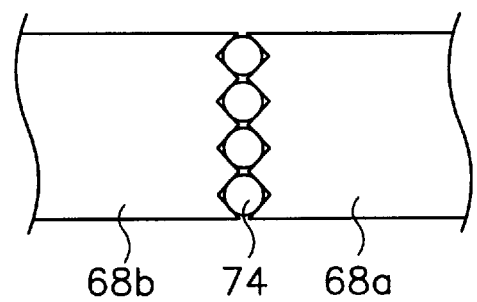
FIG. 9 is a partial sectional view illustrating an embodiment of a load cam depicted in FIG. 8.
Figure 10:
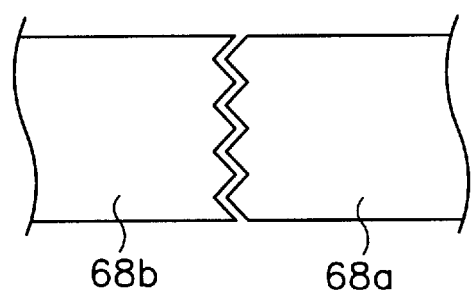
FIG. 10 is a partial sectional view illustrating another embodiment of the load cam.

Generally, the load cam 68, as shown in FIG. 10 is divided in its input and output ends 68a and 68b and each end of the input and output ends 68a and 68b facing each other is provided with saw teeth. Balls 74 can be provided between the input and output ends 68a and 68b according to one embodiment shown in FIG. 9, while the input and output ends 68a and 68b mesh with each other at their saw teeth according to another embodiment shown in FIG. 10.

Accordingly, when a load is applied from the second speed changing mechanism 14 to the output end 68b of the load cam 68, a slip occurs at the saw teeth through clearance between the balls 74 and the saw teeth in FIG. 9 or through clearance between the saw teeth of the input end 68a and the saw teeth of the output end 68b, thereby absorbing the load.

As a result, since the excessive can not be applied to the planet roller 20 connected to the input end 68a by means of the load cam 68, the speed changing operation can be smoothly realized.

That is, when drive resistance applied to the drive wheel of a practical vehicle is applied the transmission according to the present invention becomes larger, this drive resistance is transmitted to the output carrier 28 of the first speed changing mechanism 10 through the second speed changing mechanism 14 and is then induced to the load cam 68. At this point, since some of the drive resistance is absorbed in the load cam 68, the planet rollers 20 are not overloaded.

In addition, since the spring 64 mounted on the front end of the pivot axis 22 of the planet rollers 20 functions as a means for absorbing the load transmitted to the planet rollers 20 through the load cam 68 in case the driving resistance becomes larger as described above, when the planet rollers 20 move along the axial direction, and the planet rollers 20 move while compressing the spring 64. And, when the applied driving resistance is released, the planet rollers 20 return to its original position while the compressed spring 64 is restored.

Furthermore, the pre-load nut 66 mounted on the pivot axis 22 serves as means for tightening the pivot axis 22 of the planet rollers 20. Accordingly, rotating resistance of the planet rollers 20 is varied in accordance with the degree of the tightness.

In other words, the friction resistance generating between the movable ring 24 and the planet roller 20 is determined in accordance with the degree of tightness.

As described above, by regulating the rotating resistance of the planet rollers 20 using the pre-load nut 66, the friction resistance between the planet roller 20 and the movable ring 24 can be properly regulated according to characteristics of the driving means where the transmission of the present invention will be applied.

On the one hand, the one-way clutch 70 is for smoothly connecting or disconnecting power when the first clutch C1 is released. That is, when the power is transmitted by locking the first clutch C1, the one-way clutch 70 is set to be in an idling state so that the power can not be transmitted therethrough.

However, when the first clutch C1 is released and the second clutch C2 is locked, the rotational speed transmitted from the first speed changing mechanism 10 is transmitted into the output shaft 16 through the second clutch C2. The moment that the first clutch C1 is released and the second clutch C2 is locked, the rotational speed from the first speed changing mechanism 10 does not transmitted to the pinion gears 50 of the planetary gear unit 46 but continuously transmitted to the sun gear 48. At the moment, as shown in FIG. 14, the one-way clutch 70 is locked by the difference between the rotational speed of the pinion gears 50 and the instant rotational speed which is instant of the sun gear 48.

Then, the state that the rotational speed of the input shaft 12 is transmitted into the pinion gears 50 of the planetary gear unit 46 through the instantaneously locked one-way clutch 70 is maintained and the second clutch C2 is locked. Therefore smoothly accomplishing the speed changing from the medium speed range to the high speed range, is smoothly accomplished.

Figure 11:
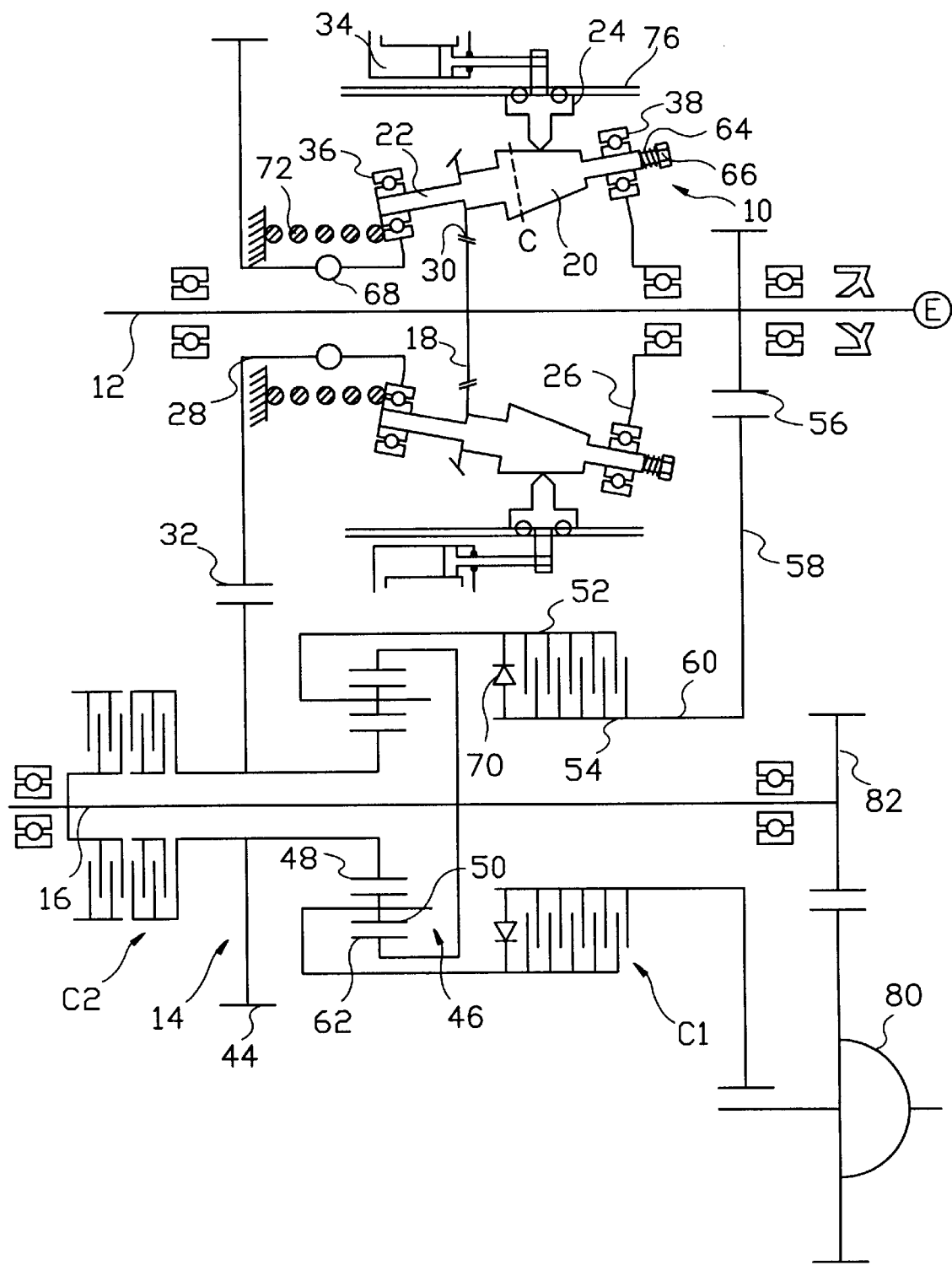
FIG. 11 is a schematic diagram illustrating an infinitely variable speed transmission in accordance with a fifth embodiment of the present invention.
Figure 12:
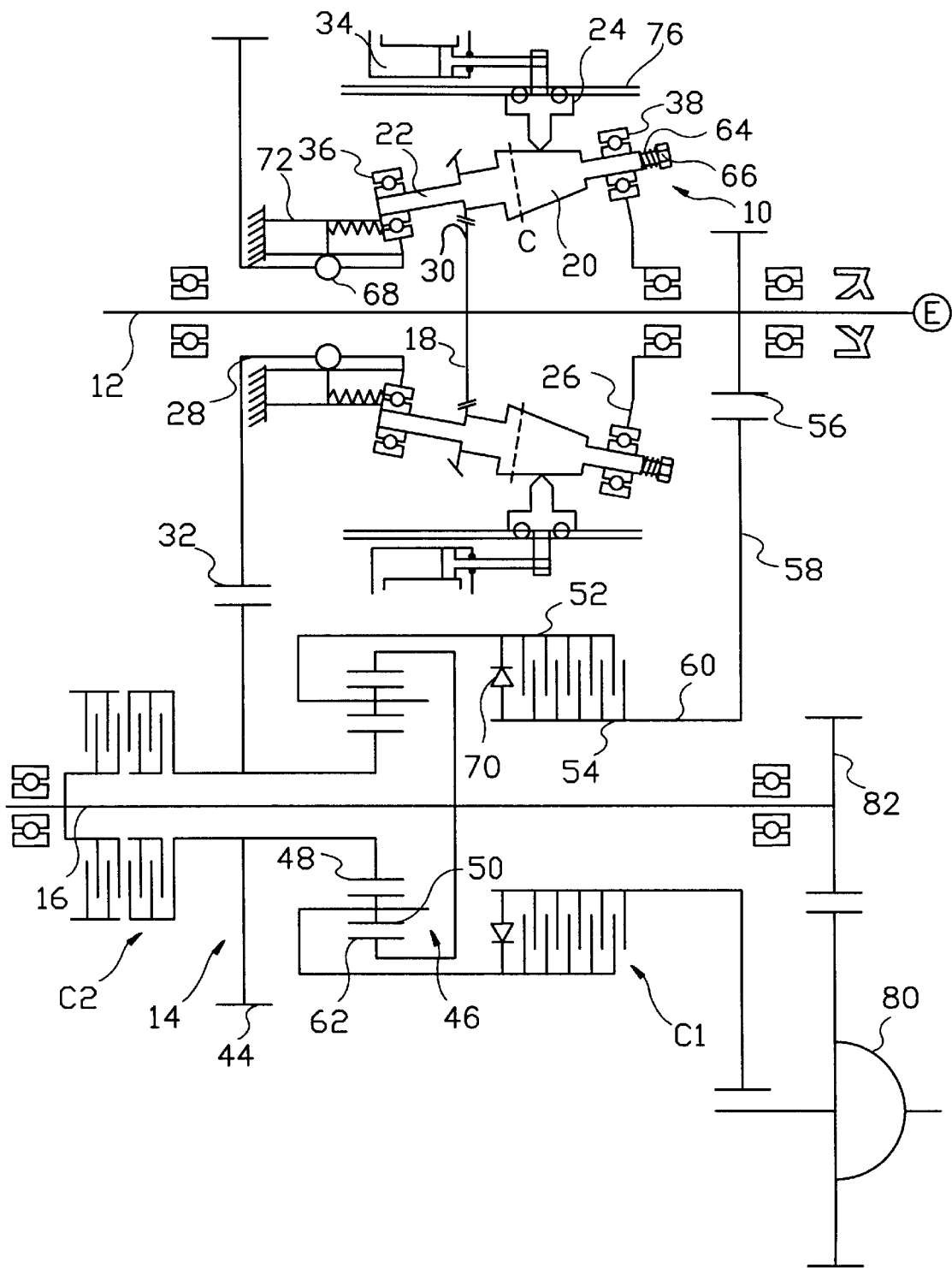
FIG. 12 is a schematic diagram illustrating an infinitely variable speed transmission in accordance with a sixth embodiment of the present invention.

FIG. 11 shows a fifth embodiment according to the present invention, and FIG. 12 shows a sixth embodiment according to the present invention. In these embodiments, an elastic means 72 is disposed between the vertical hem of the large diameter portion of the planet roller 20 and a transmission case 76 in addition to the fourth embodiment. As the planet rollers 20 are provided with the elastic means 72, when the movable ring 24 moves along the surface of the large diameter portion of the planet rollers 20, the friction resistance of the movable ring 24 with respect to the planet rollers 20 is occurred and the planet rollers 20 are pushed by the friction resistance in the direction of large diameter portion thereof. In this case, the elastic means 72 elastically supports the planet rollers 20 thereby preventing it from being escaped from the carriers 26 and 28.

Also, the elastic means 72 can support bearings 36 supporting the pivot axis 22 of the planet rollers 20, and the elastic means 72 can be supported to the transmission case 76 or the output carrier 28.

Also, the elastic means 72 can be simply constituted by a spring as the fifth embodiment according to the present invention shown in FIG. 11, and it can be constituted by a hydraulic cylinder operated by a compressed fluid or gas as shown in FIG. 12.

Figure 13:
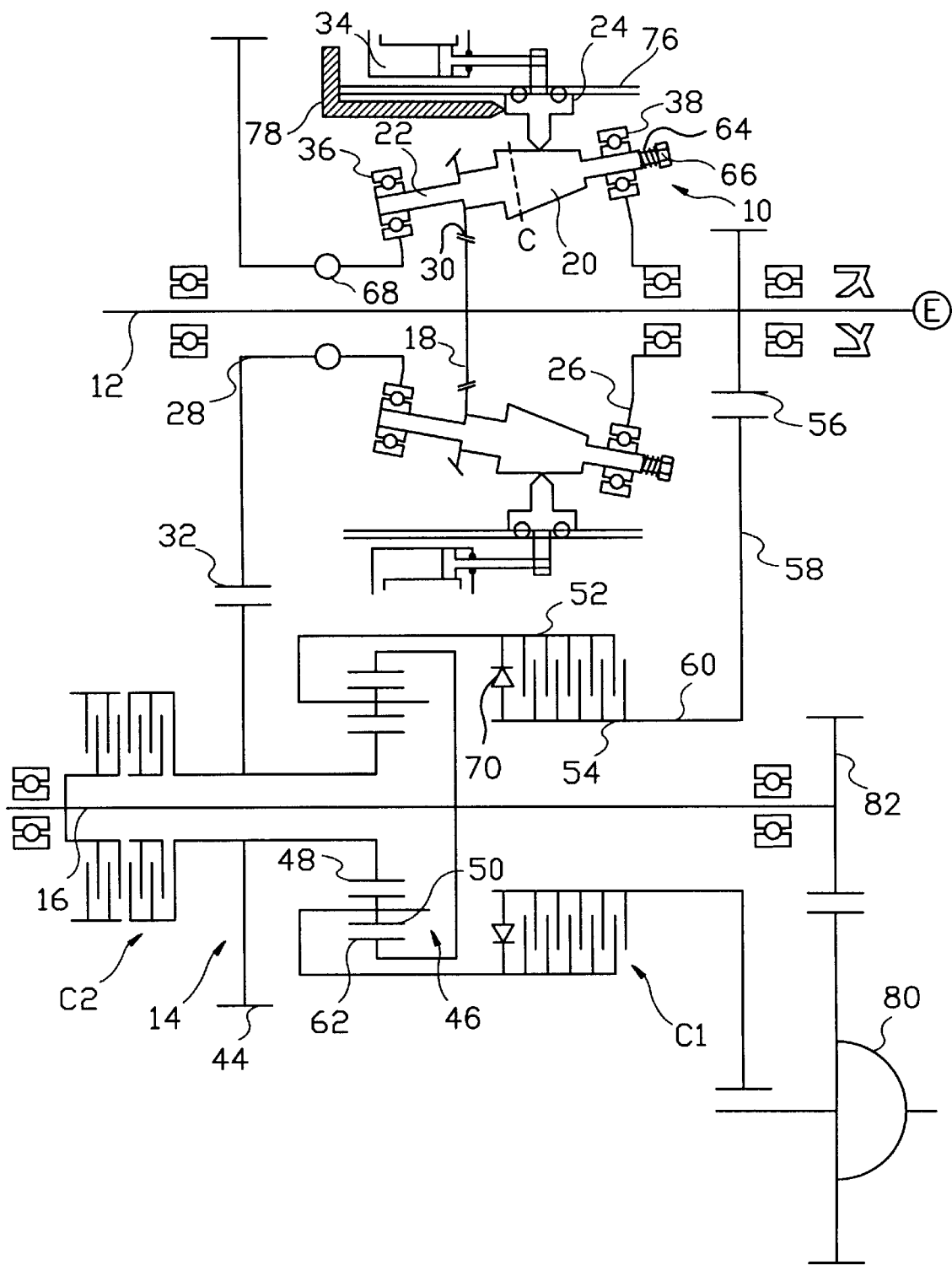
FIG. 13 is a schematic diagram illustrating an infinitely variable speed transmission in accordance with a seventh embodiment of the present invention.

As a seventh embodiment is shown in FIG. 13, a position detecting sensor 78 electronically controlled is disposed on the movable ring 24 moving along the surface of the planet rollers 20, thereby correctly detecting the moving distance of the movable ring 24 thereby precisely controlling the speed changing state.

Figure 15:
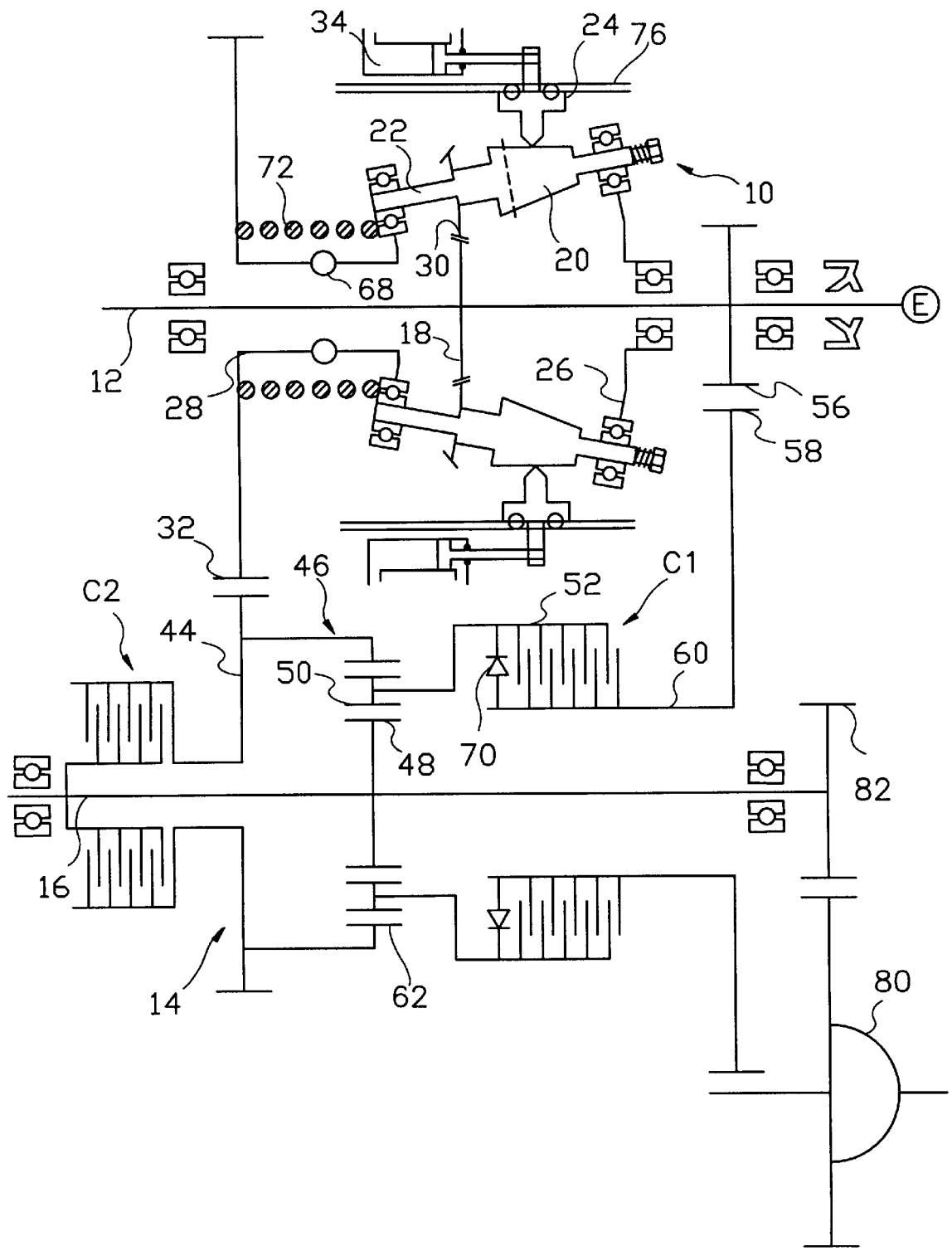
FIG. 15 is a schematic diagram illustrating an infinitely variable speed transmission in accordance with the eighth embodiment of the present invention.

FIG. 15 shows an eighth embodiment according to the present invention. In this embodiment, the structure of the second speed changing mechanism 14, which is connected to the first speed changing mechanism 10 for firstly speed changing the power transmitted from the engine thereby secondly speed changing mechanism 14 according to the condition required, is changed.

On the other hand, the first speed changing mechanism 10 connected to the second speed changing mechanism 14 of the eighth embodiment can be the structure of the first to third embodiments of the present invention. The figures are shown with reference to the second embodiment.

As shown in FIG. 15, the second speed changing mechanism 14 according to the eighth embodiment, in the same manner of another embodiments described above, is constituted by the low speed control means composed of the first clutch C1, the planetary gear unit 46, the direct connection gear 58 and the high speed gear 56, and the high speed control means composed of the second clutch C2.

In the eighth embodiment, the input element and output element of the planetary gear unit 46 are differently disposed from that of another embodiments, but the other elements, for instance the second clutch C2 and the first clutch C1 are connected to the high speed gear 56 through the direct connection gear 58, are the same.

That is, in the eighth embodiment of the present invention, the ring gear 62 of the planetary gear unit 46 is connected to the transfer driven gear 44, the pinion gears 50 is connected to the direct connection gear 58 through the first clutch C1, and the sun gear 48 is connected to the output shaft 16.

Accordingly, the input element of the planetary gear unit 46 is constituted by the ring gear 62 receiving the power from the first speed changing mechanism 10 and the pinion gears 50 directly receiving the power of the engine through the first clutch C1 from the high speed gear 56, and the output element thereof is constituted by the sun gear 48.

In the eighth embodiment of the present invention, another equation of the speed relation different from that of the first to seventh embodiments is defined by, $$\lambda \omega_S = (1+\lambda)\omega_C - \omega_R \quad (3)$$

where, $\lambda$=diameter of the sun gear/diameter of the ring gear $\omega_C$=rotational speed of the carrier for connecting the pinion gear $\omega_R$=rotational speed of the ring gear, and $\omega_S$=rotational speed of the sun gear.

$(1+\lambda)/\lambda$, the value of $\omega_S/\omega_C$

The result is, $$\omega_S/\omega_R = (1+\lambda)/\lambda \cdot \omega_C/\omega_R - 1/\lambda \quad (4)$$

Figures 16, 17:
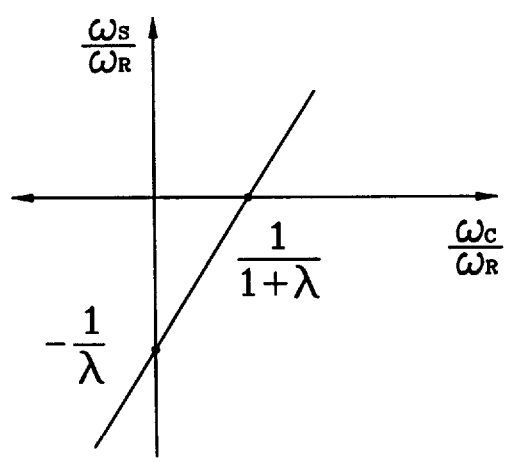
FIG. 16 is a table illustrating combination of acting elements at each speed mode of the transmission according to the eighth embodiment of the present invention.
FIG. 17 is a graphical illustration of a speed outputted from the transmission depicted in FIG. 15.

FIG. 17, the equation is graphically illustrated. As shown in the graph, in the planetary gear unit 46 where the input ends are the ring gear 62 and the pinion gears 50 and the output end is the sun gear 48, since the rotational speed $\omega_C$ of the carrier connecting with the pinion gears 50 each other is constant, if the rotational speed $\omega_R$ of the ring gear 62 increase, the rotational speed ratio $\omega_C/\omega_R$ of the pinion gears 50 with respect to the ring gear 21 is reduced. Therefore the speed ratio $\omega_S/\omega_R$ outputted through the sun gear 48 is decreased.

On the contrary, if the rotational speed inputted through the ring gear 62 is decreased, the rotational speed of the sun gear 48 gradually is increased.

Accordingly, as the moveable ring 24 of the first speed changing mechanism 10 moves along the longitudinal direction of the planet rollers 20 and the operating diameter of the planet rollers 20 with respect to the movable ring 24 is varied, the rotational speed outputted through the output carrier 28 of the first speed changing mechanism 10 is varied. Since the rotational speed of the ring gear 62 receiving the rotational speed of the output carrier 28 is also varied, the rotational speed transmitted, from the sun gear 48 into the output shaft 16 according to the operating principle of the planetary gear unit 46 described above, linearly is increased or decreased.

Further, if the rotational speed ratio of the pinion gears 50 with respect to the ring gear 62, $\omega_C/\omega_S$ is smaller than $1/(1+\lambda)$, $\omega_S/\omega_R$ is a negative value.

This means that since the rotational speed $\omega_R$ of the ring gear 62 is the common denominator, if the rotational speed of the ring gear 62 with respect to the pinion gears 50 is increased more than a predetermined value, the rotation of the sun gear 48 is reversely rotated. This can be easily understood from the graph in FIG. 17.

The planetary gear unit 46 constituted as the eighth embodiment has operating features as described above, wherein the features of this planetary gear unit 46 and the first speed changing mechanism 10 described in another embodiments are compounded thereby accomplishing the continuously speed changing. The operating processes will be concretely described in accordance with each speed changing state as follows.

Neutral Mode (Initial Mode)

Likewise another embodiments, the neutral mode can be achieved in two states.

That is, the first operating process is that, as shown in the table of FIG. 16, in case that the first clutch C1 and second clutch C2 disposed on the output shaft 16 are released, though the power is transmitted from the first speed changing mechanism 10 into the transfer driven gear 44 of the second speed changing mechanism 14 through the transfer drive gear 32 disposed on the output carrier 28 of the first speed changing mechanism 10, since the first clutch C1 and the second clutch C2 does not transmit the power respectively, the transfer driven gear 44 is idling so that the power is not transmitted into the output shaft 16.

Accordingly, as described above, in case that the first clutch C1 and the second clutch C2 are released, the power is not transmitted into the output shaft 16 so that the output shaft 16 cannot rotate. Therefore the neutral mode is accomplished.

On the other hand, the second operating process is that, in state that the second clutch C2 is released and only the first clutch C1 is locked, if the movable ring 24 is positioned on the neutral line C adjacent to the vertical hem of the large diameter portion of the planet rollers 20, the rotational speed firstly changed in the first speed changing mechanism 10 is inputted into the ring gear 62 of the planetary gear unit 46 through the transfer drive gear 32 and the transfer driven gear 44, and at the same time, the power of the input shaft 12 which is not changed, is inputted into the pinion gears 50 of the planetary gear unit 46 through the high speed gear 56, the direct connection gear 58 and the first clutch C1 so that the rotational speed of the ring gear 62 is equal to that of the pinion gears 50, so that relative rotation between the ring gear 62 and pinion gears 50 does not occur, whereby the rotational speed can not be transmitted to the sun gear 48 from the pinion gears 50.

Accordingly, the sun gear 48 does not transmit the power to the output shaft 16, the neutral mode where the output shaft 16 is not driven is accomplished.

That is, in case that the first clutch C1 is locked and the movable ring 24 is positioned on the neutral line C, though the rotational speed firstly changed in the first speed changing mechanism 10 is transmitted into the speed changing control mechanism 14, the rotational speed transmitted from the first speed changing mechanism 10 and the rotational speed directly transmitted from the input shaft 12 are equal to each other in the planetary gear unit 46 of the speed changing control mechanism 14 so that the sun gear 48 of the planetary gear unit 46 does not rotate, whereby the power is not outputted to the output shaft 16.

Low-To-Medium Speed Mode

In the neutral mode, as the first clutch C1 is locked and the movable ring 24 moves from the neutral line C of the planet roller 20 to the small diameter portion, the operating diameter of the planet rollers 20 contacted with the movable ring 24, gradually decreased, the operating diameter of the planet rollers 20 is reduced. The rotational speed of the planet rollers 20 with respect to the movable ring 24 is decreased as much as diameter of the planet roller 20 is decreased, therefore the revolution speed of the output carrier 28 which connects a plurality of the planet rollers 20 each other is also decreased, and the rotational speed of the ring gear 62 of the planetary gear unit 46 in the second speed changing mechanism 14, which is connected through the output carrier 28 to the transfer drive gear 32 and the transfer driven gear 44 is gradually decreased.

On the contrary, since the rotational speed transmitted from the input shaft 12 into the pinion gears 50 through the high speed gear 56, the direct connection gear 58 and the first clutch C1 is not varied, as the movable ring 24 moves to the small diameter portion of the planet roller 20, the speed of the pinion gears 50 with respect to the ring gear 62 is gradually increased.

Accordingly, as shown in the equation 4 and the graph of FIG. 17, as the rotational speed $\omega_R$ of the ring gear 62 is gradually decreased, the rotational speed of the ring gear 62 and the rotational speed of the pinion gears 50 are compounded each other. As a result, the rotational speed S outputted through the sun gear 48 is gradually increased and rotational speed of the output shaft 16 connected with the sun gear 48 is increased.

Therefore, as the moveable ring 24 moves to the small diameter portion of the planet roller 20, the rotational speed transmitted into the output shaft 16 through the sun gear 48 is gradually increased.

This is the processes of speed changing from the low speed range to the medium speed range of the infinitely variable transmission according to the present invention. The diameter of the planet rollers 20 contacted with the movable ring 24 is linearly varied so that the rotational speed exhausted through the planetary gear unit 46 is gradually increased, therefore the speed changing from the low speed range to the medium speed range is continuously accomplished.

Medium-to-High Speed Mode

When the speed changing to the medium speed range is accomplished by the above described processes, the movable ring 24 is positioned in the vertical hem of the small diameter portion of the planet roller 24.

In this state, if the first clutch C1 is released and the second clutch C2 is locked at the same time, because, the power transmitted from the input shaft 12 to the direct connection carrier 58 through the high speed gear 56, is closed in the first clutch C1 so that it is not transmitted to the pinion gears 50 of the planetary gear unit 46, and the rotational speed changed in the first speed changing mechanism 10 is directly transmitted into the output shaft 16 through the second clutch C2. This is the converting state from the medium speed mode to the high speed mode.

When the second clutch C2 is locked, the power of the first speed changing mechanism 10 is transmitted into the output shaft 16 through the transfer driven gear 44 and the second clutch C2. In this processes, since the rotational speed changed in the first speed changing mechanism 10 is not changed again but is directly transmitted into the output shaft 16 through the second clutch C2, if the rotational speed outputted from the first speed changing mechanism 10 is increased, the rotational speed of the output shaft 16 receiving the rotational speed through the second clutch C2 is increased at the same ratio.

Accordingly, as the movable ring 24 is moved from the small diameter portion to the large diameter portion of each planet roller 20, the rotational speed of the output carrier 28 connecting the planet rollers 20 with each other is increased and the increased speed is directly transmitted to the output shaft 16 through the second clutch C2. Thereby the rotational speed is increased.

As described above, in the medium-to-high forward speed mode, the rotational speed outputted from the first speed changing mechanism 10 is directly transmitted to the output shaft 16 without a special complicated speed changing operation.

Therefore, in the medium-to-high forward speed mode, the rotational speed from the first speed changing mechanism 10 is transmitted only through the second clutch C2 of the second speed changing mechanism 14.

In addition, since the rotating diameter of each planet rollers 20 is linearly increased, the output speed of the output shaft 16 which receives the output of each planet roller 20 is gradually increased such that in this high speed mode, the speed is changed continuously.

Reverse Mode

In the reverse mode, as charted in FIG. 16, when the first clutch C1 is locked while the second clutch C2 is released, the output rotational speed from the first speed changing mechanism 10 is transmitted to the ring gear 62 of the planetary gear unit 46, and at the same time, the rotational speed of the input shaft 12 is transmitted to the pinion gears 50 of the planetary gear unit 46 through the high speed gear 56, the direct connection gear 58 and the first clutch C1.

Accordingly, as shown in the equation (4), since the speed $\omega_R$ of the ring gear 62 of the planetary gear unit 46 is the common denominator, if the speed $\omega_R$ of the ring gear 62 is to the predetermined value so that the value of $\omega_C/\omega_R$ is smaller than that of $1/1+\lambda$, the value of $\omega_S/\omega_R$ becomes negative (−).

In this state, the rotational speed ratio $\omega_S/\omega_R$ of the sun gear 48 to the ring gear 62 is determined by the speed R of the ring gear 62. According to this, the rotating direction is also determined.

Therefore, the critical line between the positive rotation and negative rotation of this sun gear 48 becomes the neutral line C indicated on the planet roller 20.

Accordingly, when the movable ring 24 is moved toward the large diameter portion passing the neutral line C indicated on the planet rollers 20, the output rotational speed of the output carrier 28 connecting the planet rollers 20 each other is increased to thereby increase the rotational speed of the transfer drive gear 32 connected to the output carrier 28, such that the rotational speed of the planetary gear unit 46 connected to the transfer drive gear 32 through the transfer driven gear 44 is increased over the critical value. As a result, the rotating direction outputted through, the sun gear 48 of the planetary gear unit 46 is reversed.

During the above process, the movable ring 24 moves over the neutral line C indicated on the planet rollers 20. The movable ring 24 moves to the largest diameter portion over the neutral line C then the speed changing from the medium speed range to the highest speed range is accomplished without reversing of the output shaft as the reverse mode. This results in that in case of the high speed positive rotation, the second clutch C2 is locked and the first clutch C1 is released, on the contrary, in case of reverse rotation, the first clutch C1 is locked and the second clutch C2 is released, so that the state of the positive rotation is not same as that of the reverse rotation.

That is, even the movable ring 24 moves to the largest diameter portion of the planet roller 20, if the clutch C1 is released and the second clutch C2 is locked, the planetary gear unit 46 does not operate so that the equations (3) and (4) do not applied.

In this eighth embodiment, like the seventh embodiment, the one-way clutch 70 can be additionally mounted on the first clutch C1 so that the smooth speed changing operation can be realized in the medium-to-high forward speed mode.

That is, in the medium-to-high forward speed mode, since the ring gear 62 of the planetary gear unit 46 always meshes with the transfer drive gear 32 through the transfer driven gear 44, the ring gear 62 rotates in idle state that power is not transmitted to the pinion gears 50 of the planetary gear unit 46.

Accordingly, in a moment the first clutch C1 is released, the rotational speed of the ring gear 62 and the rotational speed of the planetary gear unit 46 become different from each other. The speed difference makes the pinion gears 50 rotate reverse.

As described above, as the pinion gears 50 rotate reversely, the one-way clutch 70 which has been released is to be locked to transmit power from the input shaft 12 to the pinion gears 50 through the high speed gear 56 and the direct gear 58 the same manner as the first clutch C1 is in a locking state.

Accordingly, since the second clutch C2 is locked while the medium state outputted from the planetary gear unit 46 is continued, the medium-to-high forward speed mode is smoothly accomplished.

In addition, as described in each above embodiment, the finally changed power in the second speed changing mechanism 14 is to be transmitted to the output shaft 16 and is then transmitted to a differential gear 80 of the driving means through an output gear 82 arranged on an output end of the output shaft 16, thereby driving the driving means such as an automotive vehicle with proper speed and rotational speed.

As described above, the infinitely variable speed transmission according to the present invention is designed such that the output rotational speed is continuously varied while the movable ring 24 of the first speed changing mechanism 10 moves along the surface of the planet roller 20.

In addition, the infinitely variable speed transmission according to the present invention is designed such that the positive and negative rotation can mutually converted by controlling only the rotational speed outputted from the first speed changing mechanism 10 without using a special direction converting means, such that the conversion between the forward drive and the reverse drive can simply smoothly be realized and the structure of the transmission becomes compact and simple, making it easy to install the transmission in the mounting space of the driving means.

While this invention has been described in connection with what is presently considered to be the most practical and preferred embodiments, it is to be understood that the invention is not limited to the disclosed embodiments, but, on the contrary, it is intended to cover various modification and equivalent arrangements included within the spirit and scope of the appended claims.

What is claimed is:

1. An infinitely variable speed transmission, comprising:
   a first speed changing mechanism for initially changing rotational speed from an engine into a necessary initial output speed, comprising:
   an input sun gear disposed on an input shaft which receives power from the engine;
   a plurality of planet rollers which are disposed around the input sun gear at a predetermined distance from each other, each planet roller having a truncated cone-shape and a pivot axis and being revolvable around the input sun gear and rotatable around the respective pivot axis of the respective planet roller;
   a carrier connecting the planet rollers with each other and outputting the initial output speed changed in the planet rollers;
   a movable ring disposed to be circumscribed on outer peripheral lines of the planet rollers and movable by a moving means along a longitudinal direction of the planet rollers to change rotational speed of the planet rollers by varying a rotating diameter thereof to the movable ring so that the initial output speed outputted through the carrier connecting the planet rollers with each other can be varied; and
   a second speed changing mechanism for finally changing the initial output speed from the first speed changing mechanism into a necessary final output speed, including:
   a planetary gear unit having a sun gear, pinion gears and a ring gear mounted on an output shaft;
   a low speed control means having a first clutch for controlling operation of the planetary gear unit; and
   a high speed control means having a second clutch mounted on the output shaft for controlling operation of the planetary gear unit;
   the sun gear of the planetary gear unit and the second clutch of the high speed control means being parallel and directly connected with the carrier of the first speed changing mechanism; and
   the pinion gears of the planetary gear unit being directly connected with the input shaft through the first clutch of the low speed control means.

2. An infinitely variable speed transmission according to claim 1, wherein each planet roller is made of one truncated cone-shaped body and the carrier is provided with a transfer drive gear for transmitting power to the output shaft, the cone-shaped body being provided with a gear meshing with the input sun gear.

3. An infinitely variable speed transmission according to claim 1, wherein an outer surface of each planet roller contacting with the movable ring is parallel to the input shaft to maintain a pressed state of the movable ring on each planet roller while the movable ring moves along each planet roller in the longitudinal direction.

4. An infinitely variable speed transmission according to claim 1, wherein each planet roller has a spring for biasing the respective planet roller, each spring is mounted on one end of the respective pivot axis of the respective planet roller.

5. An infinitely variable speed transmission according to claim 1, wherein each planet roller has a pre-load nut mounted on one end of the respective pivot axis of the respective planet roller to adjust friction force generating between the respective planet roller and the movable ring by determining rotating resistance of the respective planet roller.

6. An infinitely variable speed transmission according to claim 1, wherein a load cam is mounted on the carrier to prevent excessive resistance from being applied to the first speed changing mechanism.

7. An infinitely variable speed transmission according to claim 1, wherein a position sensor for detecting a moving distance of the movable ring is mounted on the movable ring.

8. An infinitely variable speed transmission according to claim 1, wherein an elastic means is mounted between a large diameter end of each planet roller and a transmission case to prevent each planet roller from moving in the longitudinal direction by friction resistance.

9. An infinitely variable speed transmission according to claim 1, wherein the pivot axis of each planet roller is separated and a bearing is mounted between each planet roller and the pivot axis thereof to improve rotating performance therebetween.

10. An infinitely variable speed transmission, comprising
a first speed changing mechanism for initially changing rotation speed from an engine into a necessary initial output speed, including:
a movable sun ring disposed on an input shaft which receives power from the engine;
a plurality of planet rollers which are disposed around the movable sun ring at a predetermined distance from each other, each planet roller is made up of two truncated cone-shaped bodies which are combined such that they are symmetrically faced with each other at their large diameter portions, the movable sun ring tightly contacting and movable along one of the two truncated cone-shaped bodies by a moving member to thereby vary a speed changing diameter of each planet roller;
a carrier for connecting the planet rollers with each other and outputting the initial output speed changed in the planet rollers;
a movable ring disposed to be circumscribed on outer peripheral lines of the planet rollers and movable by a moving means along a longitudinal direction of the planet rollers to change rotational speed of the planet rollers by varying a rotating diameter thereof to the movable ring so that the initial output speed outputted through the carrier connecting the planet rollers with each other can be varied; and
a second speed changing mechanism for finally changing the initial output speed from the first speed changing mechanism into a necessary final output speed, including:
a planetary gear unit having a sun gear, pinion gears and a ring gear mounted on an output shaft;
a low speed control means having a first clutch for controlling operation of the planetary gear unit; and
a high speed control means having a second clutch mounted on the output shaft for controlling operation of the planetary gear unit;
the sun gear of the planetary gear unit and the second clutch of the high speed control means being parallel and directly connected with the carrier of the first speed changing mechanism; and
the pinion gears of the planetary gear unit being directly connected with the input shaft through the first clutch of the low speed control means.

11. An infinitely variable speed transmission according to claim 10, wherein a pivot axis of each planet roller is separated and a bearing is mounted between each planet roller and the pivot axis to improve the rotating performance therebetween.

12. An infinitely variable speed transmission according to claim 10, wherein an inner surface of the one of the two truncated cone-shaped bodies contacting the movable sun ring is parallel to the input shaft.

13. An infinitely variable speed transmission according to claim 10, wherein each of the two truncated cone-shaped bodies is movable in their longitudinal direction and a bearing is mounted therebetween.

14. An infinitely variable speed transmission according to claim 10, wherein the sun gear of the planetary gear unit constituting the second speed changing mechanism is connected to a transfer drive gear of the first speed changing mechanism through a transfer driven gear, the pinion gears of the planetary gear unit are connected to a first friction plate of the first clutch of the low speed control means, and a second friction plate of the first clutch is connected to a high speed gear disposed on the input shaft through a direct gear of the second speed changing mechanism, and the ring gear of the planetary gear unit is connected to the output shaft.

15. An infinitely variable speed transmission according to claim 14, wherein a one-way clutch is mounted between the friction plates of the first clutch.

16. An infinitely variable speed transmission, comprising:
a first speed changing mechanism for initially changing rotation speed from an engine into a necessary initial output speed, including:
an input sun gear disposed on an input shaft which receives power from the engine;
a plurality of planet rollers which are disposed around the input sun gear at a predetermined distance from each other, each planet roller having a truncated cone-shape and a pivot axis and being revolvable around the input sun gear and rotatable around the respective pivot axis of the respective planet roller;
a carrier for connecting the planet rollers with each other and outputting the initial output speed changed in the planet rollers;
a movable ring disposed to be circumscribed on outer peripheral lines of the planet rollers and movable by a moving means along a longitudinal direction of the planet rollers to change rotational speed of the planet rollers by varying a rotating diameter thereof to the movable ring so that the initial output speed outputted through the carrier connecting the planet rollers with each other can be varied; and
a second speed changing mechanism for finally changing the initial output speed from the first speed changing mechanism into a necessary final output speed, including:

a planetary gear unit having a ring gear, pinion gears and a sun gear mounted on an output shaft;

a low speed control means having a first clutch for controlling operation of the planetary gear unit; and a high speed control means having a second clutch mounted on the output shaft for controlling operation of the planetary gear unit;

the ring gear of the planetary gear unit and the second clutch of the high speed control means being parallel and directly connected with the carrier of the first speed changing mechanism; and the pinion gears of the planetary gear unit being directly connected with the input shaft through the first clutch of the low speed control means.

17. An infinitely variable speed transmission according to claim 16, wherein a one-way clutch is mounted between both friction plates of the first clutch.

* * * * *